US012300253B2

(12) United States Patent
Jensen et al.

(10) Patent No.: US 12,300,253 B2
(45) Date of Patent: *May 13, 2025

(54) PHASE RECONSTRUCTION IN A SPEECH DECODER

(71) Applicant: Microsoft Technology Licensing, LLC, Redmond, WA (US)

(72) Inventors: Soren Skak Jensen, Vancouver (CA); Sriram Srinivasan, Sammamish, WA (US); Koen Bernard Vos, Singapore (SG)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/377,062

(22) Filed: Oct. 5, 2023

(65) Prior Publication Data

US 2024/0046937 A1 Feb. 8, 2024

Related U.S. Application Data

(63) Continuation of application No. 17/875,237, filed on Jul. 27, 2022, now Pat. No. 11,817,107, which is a (Continued)

(51) Int. Cl.
*G10L 19/00* (2013.01)
*G10L 19/26* (2013.01)

(Continued)

(52) U.S. Cl.
CPC ........ *G10L 19/0018* (2013.01); *G10L 19/265* (2013.01); *G10L 25/12* (2013.01); *G10L 25/69* (2013.01); *G10L 25/72* (2013.01)

(58) Field of Classification Search
CPC ... G10L 19/0018; G10L 19/08; G10L 19/265; G10L 25/12; G10L 25/69; G10L 25/72;

(Continued)

(56) References Cited

U.S. PATENT DOCUMENTS 5,684,920 A 11/1997 Iwakami et al.
5,839,098 A 11/1998 Laroia et al.

(Continued)

FOREIGN PATENT DOCUMENTS

CN 1437747 8/2003
CN 1957398 5/2007

(Continued)

OTHER PUBLICATIONS

Communication pursuant to Rules 70(2) and 70a(2) EPC and reference to Rule 39(1) EPC dated Dec. 18, 2023, from European Patent Application No. 23193037.1, 2 pp.

(Continued)

*Primary Examiner* — Yogeshkumar Patel
(74) *Attorney, Agent, or Firm* — Klarquist Sparkman, LLP

(57) ABSTRACT

Innovations in phase quantization during speech encoding and phase reconstruction during speech decoding are described. For example, to encode a set of phase values, a speech encoder omits higher-frequency phase values and/or represents at least some of the phase values as a weighted sum of basis functions. Or, as another example, to decode a set of phase values, a speech decoder reconstructs at least some of the phase values using a weighted sum of basis functions and/or reconstructs lower-frequency phase values then uses at least some of the lower-frequency phase values to synthesize higher-frequency phase values. In many cases, the innovations improve the performance of a speech codec in low bitrate scenarios, even when encoded data is delivered over a network that suffers from insufficient bandwidth or transmission quality problems.

20 Claims, 11 Drawing Sheets

700

Related U.S. Application Data continuation of application No. 17/175,455, filed on Feb. 12, 2021, now Pat. No. 11,443,751, which is a continuation of application No. 16/222,833, filed on Dec. 17, 2018, now Pat. No. 10,957,331.

(51) Int. Cl.
*G10L 25/12* (2013.01)
*G10L 25/69* (2013.01)
*G10L 25/72* (2013.01)

(58) Field of Classification Search
CPC . G10L 21/038; G10L 19/0212; G10L 19/125; G10L 19/167; G10L 19/06; G10L 19/24; G10L 19/04; G10L 19/093; G10L 19/12; G10L 21/02
See application file for complete search history.

(56) References Cited

U.S. PATENT DOCUMENTS

| | | | | |
|---|---|---|---|---|
| 6,009,387 | A | 12/1999 | Ramaswamy et al. | |
| 6,148,283 | A | 11/2000 | Das | |
| 10,847,172 | B2 | 11/2020 | Jensen et al. | |
| 10,957,331 | B2 | 3/2021 | Jensen et al. | |
| 11,443,751 | B2 * | 9/2022 | Jensen | G10L 19/08 |
| 11,817,107 | B2 * | 11/2023 | Jensen | G10L 25/72 |
| 2005/0228651 | A1 * | 10/2005 | Wang | G10L 19/08 704/207 |
| 2006/0271354 | A1 * | 11/2006 | Sun | G10L 19/26 704/205 |
| 2008/0040105 | A1 * | 2/2008 | Wang | G10L 19/005 704/E19.018 |
| 2011/0196684 | A1 * | 8/2011 | Koishida | G10L 19/038 704/500 |
| 2015/0149156 | A1 * | 5/2015 | Atti | G10L 19/265 704/205 |

FOREIGN PATENT DOCUMENTS

| | | |
|---|---|---|
| CN | 103050121 | 5/2013 |
| CN | 105118513 | 12/2015 |
| CN | 105765655 | 7/2016 |
| TW | 454168 | 9/2001 |
| WO | WO 2015/054421 | 4/2015 |

OTHER PUBLICATIONS

Communication pursuant to Rules 70(2) and 70a(2) EPC and reference to Rule 39(1) EPC dated Dec. 18, 2023, from European Patent Application No. 23193038.9, 2 pp.
Extended European Search Report dated Nov. 9, 2023, from European Patent Application No. 23193038.9, 8 pp.
Notification of Granting a Patent dated Jun. 13, 2024, from Chinese Patent Application No. 201980083619.4, 8 pp.
Office Action dated Dec. 22, 2023, from Chinese Patent Application No. 201980083619.4, 11 pp.
Office Action dated Dec. 27, 2023, from Chinese Patent Application No. 201980082842.7, 11 pp.
ISO/IEC, "Information Technology—Coding of Audio-Visual Objects—Part 3: Audio," ISO/IEC 14496-3, 1416 pp. (Sep. 2009).
ISO/IEC, "Information technology—Coding of Moving Pictures and Associated Audio for Digital Storage Media at up to About 1,5 Mbit/s—Part 3: Audio," ISO/IEC 11172-3, 157 pp. (Aug. 1993).
ISO/IEC, "Information Technology—MPEG Audio Technologies—Part 3: Unified Speech and Audio Coding," ISO/IEC 23003-3, 348 pp. (Jun. 2020).
Lupini, "Harmonic Coding of Speech at Low Bit Rates," Simon Fraser University, Ph.D. Thesis, 151 pp. (Sep. 1995), downloaded from https://core.ac.uk/download/pdf/56371034.pdf.
MPEG, "MPEG Unified Speech and Audio Coding (USAC)," MPEG-N12235, 4 pp. (Jul. 2011).
Neuendorf et al., "The ISO/MPEG Unified Speech and Audio Coding Standard—Consistent High Quality for all Content Types and at all Bit Rates," J. Audio Eng. Soc., vol. 61, No. 12, pp. 956-977 (Dec. 2013).
Notice of Granting Patent dated Oct. 25, 2024, from Chinese Patent Application No. 201980082842.7, 8 pp.

* cited by examiner

300

500

604 (example of operations in encoding stage 620)

700

1001

1002 (example of operations in decoding stage 1020)

1003 (example of operations in decoding stage 1020)

PHASE RECONSTRUCTION IN A SPEECH DECODER

CROSS REFERENCE TO RELATED APPLICATIONS

This application is a continuation of U.S. patent application Ser. No. 17/875,237, filed Jul. 27, 2022, which is a continuation of U.S. patent application Ser. No. 17/175,455, filed Feb. 12, 2021, which is a continuation of U.S. patent application Ser. No. 16/222,833, filed Dec. 17, 2018, the disclosure of which is hereby incorporated by reference.

BACKGROUND

With the emergence of digital wireless telephone networks, streaming of speech over the Internet, and Internet telephony, digital processing of speech has become commonplace. Engineers use compression to process speech efficiently while still maintaining quality. One goal of speech compression is to represent a speech signal in a way that provides maximum signal quality for a given amount of bits. Stated differently, this goal is to represent the speech signal with the least bits for a given level of quality. Other goals such as resiliency to transmission errors and limiting the overall delay due to encoding/transmission/decoding apply in some scenarios.

One type of conventional speech encoder/decoder ("codec") uses linear prediction ("LP") to achieve compression. A speech encoder finds and quantizes LP coefficients for a prediction filter, which is used to predict sample values as linear combinations of preceding sample values. A residual signal (also called an "excitation" signal) indicates parts of the original signal not accurately predicted by the filtering. The speech encoder compresses the residual signal, typically using different compression techniques for voiced segments (characterized by vocal chord vibration), unvoiced segments, and silent segments, since different kinds of speech have different characteristics. A corresponding speech decoder reconstructs the residual signal, recovers the LP coefficients for use in a synthesis filter, and processes the residual signal with the synthesis filter.

Considering the importance of compression to representing speech in computer systems, speech compression has attracted significant research and development activity. Although previous speech codecs provide good performance for many scenarios, they have some drawbacks. In particular, problems may surface when previous speech codecs are used in very low bitrate scenarios. In such scenarios, a wireless telephone network or other network may have insufficient bandwidth (e.g., due to congestion or packet loss) or transmission quality problems (e.g., due to transmission noise or intermittent delays), which prevent delivery of encoded speech under quality constraints and time constraints that apply for real-time communication.

SUMMARY

In summary, the detailed description presents innovations in speech encoding and speech decoding. Some of the innovations relate to phase quantization during speech encoding. Other innovations relate to phase reconstruction during speech decoding. In many cases, the innovations can improve the performance of a speech codec in low bitrate scenarios, even when encoded data is delivered over a network that suffers from insufficient bandwidth or transmission quality problems.

According to a first set of innovations described herein, a speech encoder receives speech input (e.g., in an input buffer), encodes the speech input to produce encoded data, and stores the encoded data (e.g., in an output buffer) for output as part of a bitstream. As part of the encoding, the speech encoder filters input values that are based on the speech input according to linear prediction ("LP") coefficients, producing residual values. The speech encoder encodes the residual values. In particular, the speech encoder determines and encodes a set of phase values. The phase values can be determined, for example, by applying a frequency transform to subframes of a current frame, which produces complex amplitude values for the subframes, and calculating the phase values (and corresponding magnitude values) based on the complex amplitude values. To improve performance, the speech encoder can perform various operations when encoding the set of phase values.

For example, when it encodes a set of phase values, the speech encoder represents at least some of the set of phase values using a linear component and a weighted sum of basis functions (e.g., sine functions). The speech encoder can use a delayed decision approach or other approach to determine a set of coefficients that weight the basis functions. The count of coefficients can vary, depending on the target bitrate for the encoded data and/or other criteria. When finding suitable coefficients, the speech encoder can use a cost function based on a linear phase measure or other cost function, so that the weighted sum of basis functions together with the linear component resembles the represented phase values. The speech encoder can use an offset value and slope value to parameterize the linear component, which is combined with the weighted sum. Using a linear component and a weighted sum of basis functions, the speech encoder can accurately represent phase values in a compact and flexible way, which can improve rate-distortion performance in low bitrate scenarios (that is, providing better quality for a given bitrate or, equivalently, providing lower bitrate for a given level of quality).

As another example, when it encodes a set of phase values, the speech encoder omits any of the set of phase values having a frequency above a cutoff frequency. The speech encoder can select the cutoff frequency based at least in part on a target bitrate for the encoded data, pitch cycle information, and/or other criteria. Omitted higher-frequency phase values can be synthesized during decoding based on lower-frequency phase values that are signaled as part of the encoded data. By omitting higher-frequency phase values (and synthesizing them during decoding based on lower-frequency phase values), the speech encoder can efficiently represent a full range of phase values, which can improve rate-distortion performance in low bitrate scenarios.

According to a second set of innovations described herein, a speech decoder receives encoded data (e.g., in an input buffer) as part of a bitstream, decodes the encoded data to reconstruct speech, and stores the reconstructed speech (e.g., in an output buffer) for output. As part of the decoding, the speech decoder decodes residual values and filters the residual values according to LP coefficients. In particular, the speech decoder decodes a set of phase values and reconstructs the residual values based at least in part on the set of phase values. To improve performance, the speech decoder can perform various operations when decoding the set of phase values.

For example, when it decodes a set of phase values, the speech decoder reconstructs at least some of the set of phase values using a linear component and a weighted sum of basis functions (e.g., sine functions). The linear component can be parameterized by an offset value and a slope value. The speech decoder can decode a set of coefficients (that weight the basis functions), the offset value, and the slope value, then use the set of coefficients, offset value, and slope value as part of the reconstructing phase values. The count of coefficients that weight the basis functions can vary depending on the target bitrate for the encoded data and/or other criteria. Using a linear component and a weighted sum of basis functions, phase values can be accurately represented in a compact and flexible way, which can improve rate-distortion performance in low bitrate scenarios.

As another example, when it decodes a set of phase values, the speech decoder reconstructs a first subset of the set of phase values, then uses at least some of the first subset to synthesize a second subset of the set of phase values, where each of the phase values in the second subset has a frequency above a cutoff frequency. The speech decoder can determine the cutoff frequency based at least in part on a target bitrate for the encoded data, pitch cycle information, and/or other criteria. To synthesize the phase values of the second subset, the speech decoder can identify a range of the first subset, determine (as a pattern) differences between adjacent phase values in the range of the first subset, repeat the pattern above the cutoff frequency, and then integrate the differences between adjacent phase values to determine the second subset. By synthesizing omitted higher-frequency phase values based on lower-frequency phase values that are signaled in a bitstream, the speech decoder can efficiently reconstruct a full range of phase values, which can improve rate-distortion performance in low bitrate scenarios.

The innovations described herein include, but are not limited to, the innovations covered by the claims. The innovations can be implemented as part of a method, as part of a computer system configured to perform the method, or as part of computer-readable media storing computer-executable instructions for causing one or more processors in a computer system to perform the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

BRIEF DESCRIPTION OF THE DRAWINGS

The following drawings illustrate some features of the disclosed innovations.

DETAILED DESCRIPTION

The detailed description presents innovations in speech encoding and speech decoding. Some of the innovations relate to phase quantization during speech encoding. Other innovations relate to phase reconstruction during speech decoding. In many cases, the innovations can improve the performance of a speech codec in low bitrate scenarios, even when encoded data is delivered over a network that suffers from insufficient bandwidth or transmission quality problems.

In the examples described herein, identical reference numbers in different figures indicate an identical component, module, or operation. More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique/tool does not solve all such problems. It is to be understood that other examples may be utilized and that structural, logical, software, hardware, and electrical changes may be made without departing from the scope of the disclosure. The following description is, therefore, not to be taken in a limited sense. Rather, the scope of the present invention is defined by the appended claims.

I. Example Computer Systems

Figure 1:
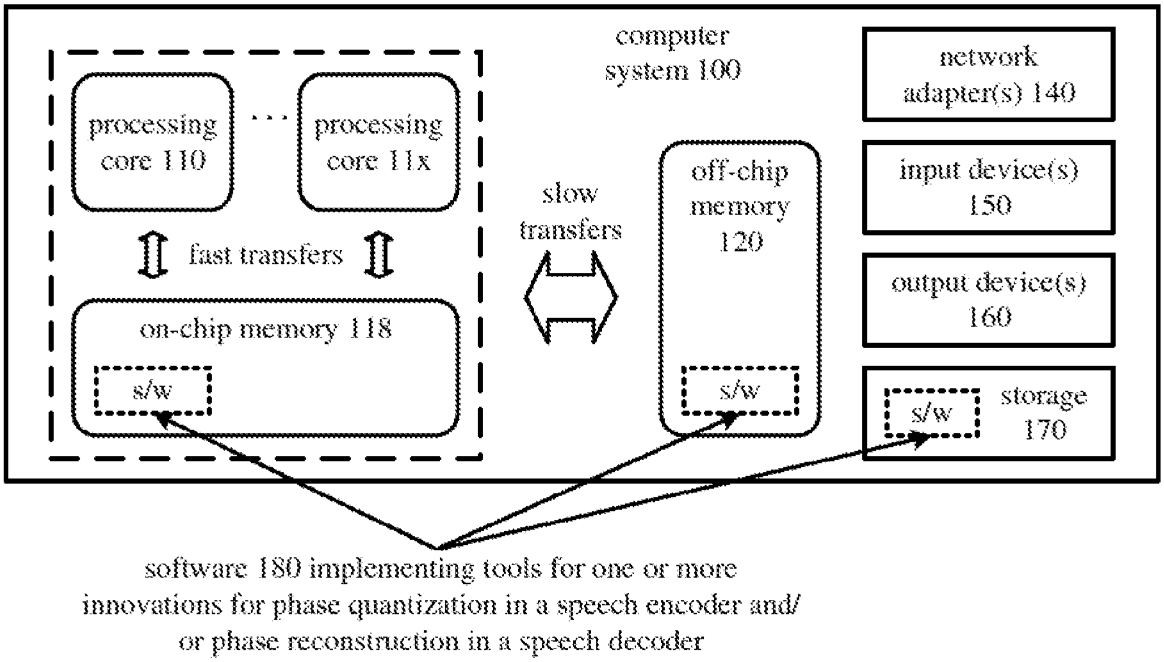
FIG. 1 is a diagram illustrating an example computer system in which some described examples can be implemented.

FIG. 1 illustrates a generalized example of a suitable computer system (100) in which several of the described innovations may be implemented. The innovations described herein relate to speech encoding and/or speech decoding. Aside from its use in speech encoding and/or speech decoding, the computer system (100) is not intended to suggest any limitation as to scope of use or functionality, as the innovations may be implemented in diverse computer systems, including special-purpose computer systems adapted for operations in speech encoding and/or speech decoding.

With reference to FIG. 1, the computer system (100) includes one or more processing cores (110 . . . 11*x*) of a central processing unit ("CPU") and local, on-chip memory (118). The processing core(s) (110 . . . 11*x*) execute computer-executable instructions. The number of processing core(s) (110 . . . 11*x*) depends on implementation and can be, for example, 4 or 8. The local memory (118) may be volatile memory (e.g., registers, cache, RAM), non-volatile memory (e.g., ROM, EEPROM, flash memory, etc.), or some combination of the two, accessible by the respective processing core(s) (110 . . . 11*x*).

The local memory (118) can store software (180) implementing tools for one or more innovations for phase quantization in a speech encoder and/or phase reconstruction in a speech decoder, for operations performed by the respective processing core(s) (110 . . . 11*x*), in the form of computer-executable instructions. In FIG. 1, the local memory (118) is on-chip memory such as one or more caches, for which access operations, transfer operations, etc. with the processing core(s) (110 . . . 11*x*) are fast.

The computer system (100) can include processing cores (not shown) and local memory (not shown) of a graphics processing unit ("GPU"). Alternatively, the computer system (100) includes one or more processing cores (not shown) of a system-on-a-chip ("SoC"), application-specific integrated circuit ("ASIC") or other integrated circuit, along with associated memory (not shown). The processing core(s) can execute computer-executable instructions for one or more innovations for phase quantization in a speech encoder and/or phase reconstruction in a speech decoder.

More generally, the term "processor" may refer generically to any device that can process computer-executable instructions and may include a microprocessor, microcontroller, programmable logic device, digital signal processor, and/or other computational device. A processor may be a CPU or other general-purpose unit, however, it is also known to provide a specific-purpose processor using, for example, an ASIC or a field-programmable gate array ("FPGA").

The term "control logic" may refer to a controller or, more generally, one or more processors, operable to process computer-executable instructions, determine outcomes, and generate outputs. Depending on implementation, control logic can be implemented by software executable on a CPU, by software controlling special-purpose hardware (e.g., a GPU or other graphics hardware), or by special-purpose hardware (e.g., in an ASIC).

The computer system (100) includes shared memory (120), which may be volatile memory (e.g., RAM), non-volatile memory (e.g., ROM, EEPROM, flash memory, etc.), or some combination of the two, accessible by the processing core(s). The memory (120) stores software (180) implementing tools for one or more innovations for phase quantization in a speech encoder and/or phase reconstruction in a speech decoder, for operations performed, in the form of computer-executable instructions. In FIG. 1, the shared memory (120) is off-chip memory, for which access operations, transfer operations, etc. with the processing cores are slower.

The computer system (100) includes one or more network adapters (140). As used herein, the term network adapter indicates any network interface card ("NIC"), network interface, network interface controller, or network interface device. The network adapter(s) (140) enable communication over a network to another computing entity (e.g., server, other computer system). The network can be a telephone network, wide area network, local area network, storage area network, or other network. The network adapter(s) (140) can support wired connections and/or wireless connections, for a telephone network, wide area network, local area network, storage area network, or other network. The network adapter(s) (140) convey data (such as computer-executable instructions, speech/audio or video input or output, or other data) in a modulated data signal over network connection(s). A modulated data signal is a signal that has one or more of its characteristics set or changed in such a manner as to encode information in the signal. By way of example, and not limitation, the network connections can use an electrical, optical, RF, or other carrier.

The computer system (100) also includes one or more input device(s) (150). The input device(s) may be a touch input device such as a keyboard, mouse, pen, or trackball, a scanning device, or another device that provides input to the computer system (100). For speech/audio input, the input device(s) (150) of the computer system (100) include one or more microphones. The computer system (100) can also include a video input, another audio input, a motion sensor/tracker input, and/or a game controller input.

The computer system (100) includes one or more output devices (160) such as a display. For speech/audio output, the output device(s) (160) of the computer system (100) include one or more speakers. The output device(s) (160) may also include a printer, CD-writer, video output, another audio output, or another device that provides output from the computer system (100).

The storage (170) may be removable or non-removable, and includes magnetic media (such as magnetic disks, magnetic tapes or cassettes), optical disk media and/or any other media which can be used to store information and which can be accessed within the computer system (100). The storage (170) stores instructions for the software (180) implementing tools for one or more innovations for phase quantization in a speech encoder and/or phase reconstruction in a speech decoder.

An interconnection mechanism (not shown) such as a bus, controller, or network interconnects the components of the computer system (100). Typically, operating system software (not shown) provides an operating environment for other software executing in the computer system (100), and coordinates activities of the components of the computer system (100).

The computer system (100) of FIG. 1 is a physical computer system. A virtual machine can include components organized as shown in FIG. 1.

The term "application" or "program" may refer to software such as any user-mode instructions to provide functionality. The software of the application (or program) can further include instructions for an operating system and/or device drivers. The software can be stored in associated memory. The software may be, for example, firmware. While it is contemplated that an appropriately programmed general-purpose computer or computing device may be used to execute such software, it is also contemplated that hard-wired circuitry or custom hardware (e.g., an ASIC) may be used in place of, or in combination with, software instructions. Thus, examples are not limited to any specific combination of hardware and software.

The term "computer-readable medium" refers to any medium that participates in providing data (e.g., instructions) that may be read by a processor and accessed within a computing environment. A computer-readable medium may take many forms, including but not limited to non-volatile media and volatile media. Non-volatile media include, for example, optical or magnetic disks and other persistent memory. Volatile media include dynamic random access memory ("DRAM"). Common forms of computer-readable media include, for example, a solid state drive, a flash drive, a hard disk, any other magnetic medium, a CD-ROM, Digital Versatile Disc ("DVD"), any other optical medium, RAM, programmable read-only memory ("PROM"), erasable programmable read-only memory ("EPROM"), a USB memory stick, any other memory chip or cartridge, or any other medium from which a computer can read. The term "computer-readable memory" specifically excludes transitory propagating signals, carrier waves, and wave forms or other intangible or transitory media that may nevertheless be readable by a computer. The term "carrier wave" may refer to an electromagnetic wave modulated in amplitude or frequency to convey a signal.

The innovations can be described in the general context of computer-executable instructions being executed in a computer system on a target real or virtual processor. The computer-executable instructions can include instructions executable on processing cores of a general-purpose processor to provide functionality described herein, instructions executable to control a GPU or special-purpose hardware to provide functionality described herein, instructions executable on processing cores of a GPU to provide functionality described herein, and/or instructions executable on processing cores of a special-purpose processor to provide functionality described herein. In some implementations, computer-executable instructions can be organized in program modules. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

Numerous examples are described in this disclosure, and are presented for illustrative purposes only. The described examples are not, and are not intended to be, limiting in any sense. The presently disclosed innovations are widely applicable to numerous contexts, as is readily apparent from the disclosure. One of ordinary skill in the art will recognize that the disclosed innovations may be practiced with various modifications and alterations, such as structural, logical, software, and electrical modifications. Although particular features of the disclosed innovations may be described with reference to one or more particular examples, it should be understood that such features are not limited to usage in the one or more particular examples with reference to which they are described, unless expressly specified otherwise. The present disclosure is neither a literal description of all examples nor a listing of features of the invention that must be present in all examples.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. The mere usage of the ordinal numbers "first," "second," "third," and so on does not indicate any physical order or location, any ordering in time, or any ranking in importance, quality, or otherwise. In addition, the mere usage of ordinal numbers does not define a numerical limit to the features identified with the ordinal numbers.

When introducing elements, the articles "a," "an," "the," and "said" are intended to mean that there are one or more of the elements. The terms "comprising," including," and "having" are intended to be inclusive and mean that there may be additional elements other than the listed elements.

When a single device, component, module, or structure is described, multiple devices, components, modules, or structures (whether or not they cooperate) may instead be used in place of the single device, component, module, or structure. Functionality that is described as being possessed by a single device may instead be possessed by multiple devices, whether or not they cooperate. Similarly, where multiple devices, components, modules, or structures are described herein, whether or not they cooperate, a single device, component, module, or structure may instead be used in place of the multiple devices, components, modules, or structures. Functionality that is described as being possessed by multiple devices may instead be possessed by a single device. In general, a computer system or device can be local or distributed, and can include any combination of special-purpose hardware and/or hardware with software implementing the functionality described herein.

Further, the techniques and tools described herein are not limited to the specific examples described herein. Rather, the respective techniques and tools may be utilized independently and separately from other techniques and tools described herein.

Device, components, modules, or structures that are in communication with each other need not be in continuous communication with each other, unless expressly specified otherwise. On the contrary, such devices, components, modules, or structures need only transmit to each other as necessary or desirable, and may actually refrain from exchanging data most of the time. For example, a device in communication with another device via the Internet might not transmit data to the other device for weeks at a time. In addition, devices, components, modules, or structures that are in communication with each other may communicate directly or indirectly through one or more intermediaries.

As used herein, the term "send" denotes any way of conveying information from one device, component, module, or structure to another device, component, module, or structure. The term "receive" denotes any way of getting information at one device, component, module, or structure from another device, component, module, or structure. The devices, components, modules, or structures can be part of the same computer system or different computer systems. Information can be passed by value (e.g., as a parameter of a message or function call) or passed by reference (e.g., in a buffer). Depending on context, information can be communicated directly or be conveyed through one or more intermediate devices, components, modules, or structures. As used herein, the term "connected" denotes an operable communication link between devices, components, modules, or structures, which can be part of the same computer system or different computer systems. The operable communication link can be a wired or wireless network connection, which can be direct or pass through one or more intermediaries (e.g., of a network).

A description of an example with several features does not imply that all or even any of such features are required. On the contrary, a variety of optional features are described to illustrate the wide variety of possible examples of the innovations described herein. Unless otherwise specified explicitly, no feature is essential or required.

Further, although process steps and stages may be described in a sequential order, such processes may be configured to work in different orders. Description of a specific sequence or order does not necessarily indicate a requirement that the steps/stages be performed in that order. Steps or stages may be performed in any order practical. Further, some steps or stages may be performed simultaneously despite being described or implied as occurring non-simultaneously. Description of a process as including multiple steps or stages does not imply that all, or even any, of the steps or stages are essential or required. Various other examples may omit some or all of the described steps or stages. Unless otherwise specified explicitly, no step or stage is essential or required. Similarly, although a product may be described as including multiple aspects, qualities, or characteristics, that does not mean that all of them are essential or required. Various other examples may omit some or all of the aspects, qualities, or characteristics.

Many of the techniques and tools described herein are illustrated with reference to a speech codec. Alternatively, the techniques and tools described herein can be implemented in an audio codec, video codec, still image codec, or other media codec, for which the encoder and decoder use a set of phase values to represent residual values.

An enumerated list of items does not imply that any or all of the items are mutually exclusive, unless expressly specified otherwise. Likewise, an enumerated list of items does not imply that any or all of the items are comprehensive of any category, unless expressly specified otherwise.

For the sake of presentation, the detailed description uses terms like "determine" and "select" to describe computer operations in a computer system. These terms denote operations performed by one or more processors or other components in the computer system, and should not be confused with acts performed by a human being. The actual computer operations corresponding to these terms vary depending on implementation.

II. Example Network Environments

Figure 2A:
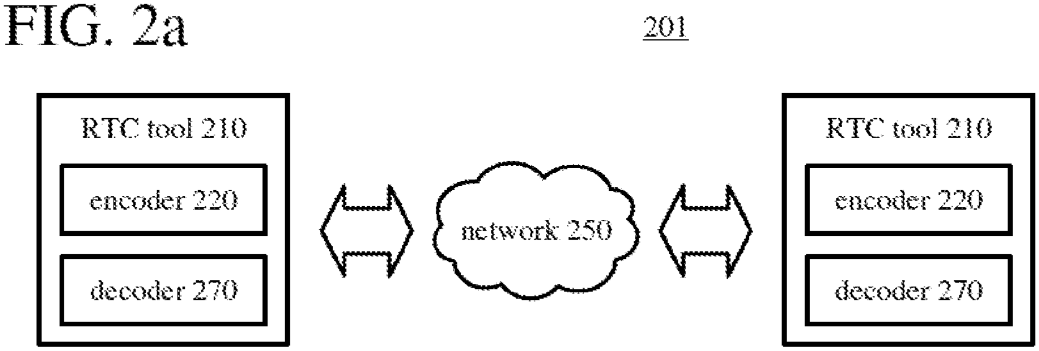
FIGS. 2*a* and 2*b* are diagrams of example network environments in which some described embodiments can be implemented.
Figure 2B:
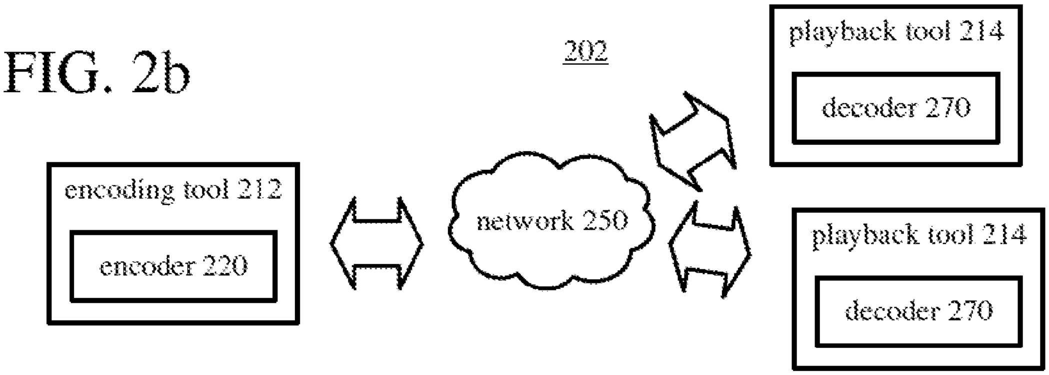

FIGS. 2*a* and 2*b* show example network environments (201, 202) that include speech encoders (220) and speech decoders (270). The encoders (220) and decoders (270) are connected over a network (250) using an appropriate communication protocol. The network (250) can include a telephone network, the Internet, or another computer network.

In the network environment (201) shown in FIG. 2*a*, each real-time communication ("RTC") tool (210) includes both an encoder (220) and a decoder (270) for bidirectional communication. A given encoder (220) can produce output compliant with a speech codec format or extension of a speech codec format, with a corresponding decoder (270) accepting encoded data from the encoder (220). The bidirectional communication can be part of an audio conference, telephone call, or other two-party or multi-party communication scenario. Although the network environment (201) in FIG. 2*a* includes two real-time communication tools (210), the network environment (201) can instead include three or more real-time communication tools (210) that participate in multi-party communication.

Figure 3:
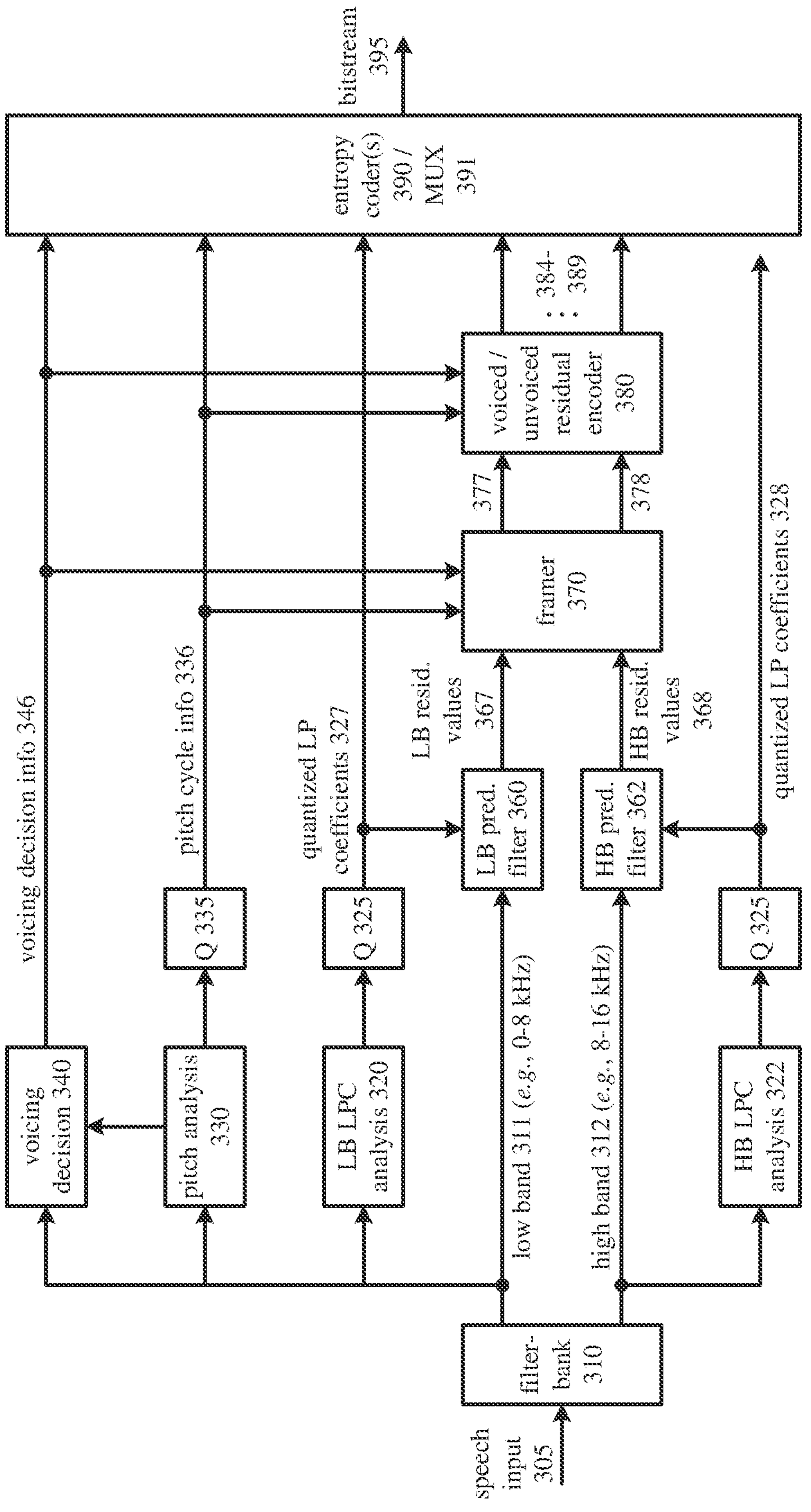
FIG. 3 is a diagram illustrating an example speech encoder system.
Figure 7:
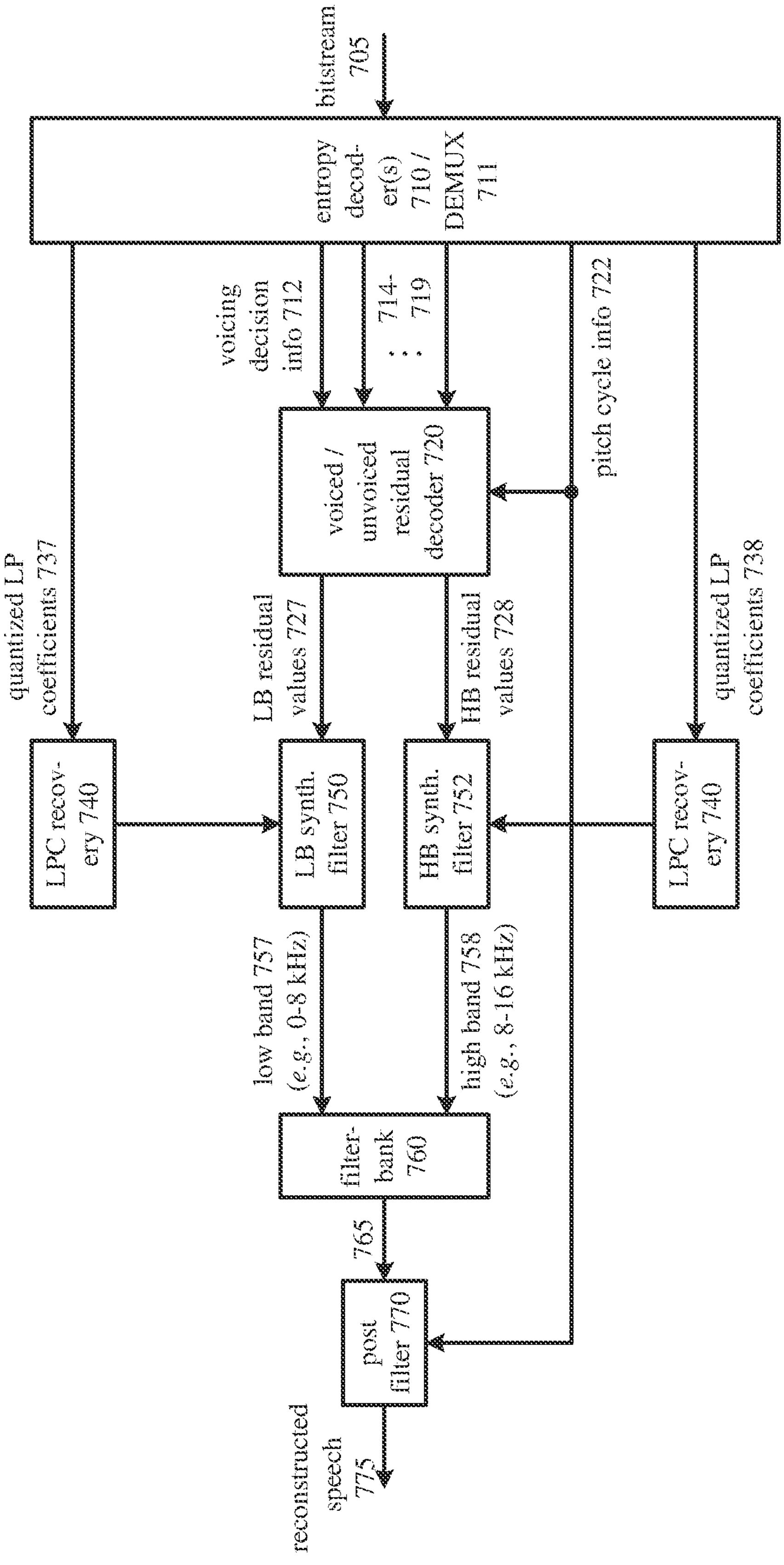
FIG. 7 is a diagram illustrating an example speech decoder system.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 7 shows an example decoder system (700), which can be included in the real-time communication tool (210). Alternatively, the real-time communication tool (210) uses another decoder system.

In the network environment (202) shown in FIG. 2*b*, an encoding tool (212) includes an encoder (220) that encodes speech for delivery to multiple playback tools (214), which include decoders (270). The unidirectional communication can be provided for a surveillance system, web monitoring system, remote desktop conferencing presentation, gameplay broadcast, or other scenario in which speech is encoded and sent from one location to one or more other locations for playback. Although the network environment (202) in FIG. 2*b* includes two playback tools (214), the network environment (202) can include more or fewer playback tools (214). In general, a playback tool (214) communicates with the encoding tool (212) to determine a stream of encoded speech for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 7 shows an example decoder system (700), which can be included in the playback tool (214). Alternatively, the playback tool (214) uses another decoder system. A playback tool (214) can also include client-side controller logic for managing connections with the encoding tool (212).

III. Example Speech Encoder Systems

FIG. 3 shows an example speech encoder system (300) in conjunction with which some described embodiments may be implemented. The encoder system (300) can be a general-purpose speech encoding tool capable of operating in any of multiple modes such as a low-latency mode for real-time communication, a transcoding mode, and a higher-latency mode for producing media for playback from a file or stream, or the encoder system (300) can be a special-purpose encoding tool adapted for one such mode. In some example implementations, the encoder system (300) can provide high-quality voice and audio over various types of connections, including connections over networks with insufficient bandwidth (e.g., low bitrate due to congestion or high packet loss rates) or transmission quality problems (e.g., due to transmission noise or high jitter). In particular, in some example implementations, the encoder system (300) operates in one of two low-latency modes, a low bitrate mode or a high bitrate mode. The low bitrate mode uses components as described with reference to FIGS. 3 and 4.

The encoder system (300) can be implemented as part of an operating system module, as part of an application library, as part of a standalone application, using GPU hardware, or using special-purpose hardware. Overall, the encoder system (300) is configured to receive speech input (305), encode the speech input (305) to produce encoded data, and store the encoded data as part of a bitstream (395). The encoder system (300) includes various components, which are implemented using one or more processors and configured to encode the speech input (305) to produce the encoded data.

The encoder system (300) is configured to receive speech input (305) from a source such as a microphone. In some example implementations, the encoder system (300) can accept super-wideband speech input (for an input signal sampled at 32 kHz) or wideband speech input (for an input signal sampled at 16 kHz). The encoder system (300) temporarily stores the speech input (305) in an input buffer, which is implemented in memory of the encoder system (300) and configured to receive the speech input (305). From the input buffer, components of the encoder system (300) read sample values of the speech input (305). The encoder system (300) uses variable-length frames. Periodically, sample values in a current batch (input frame) of speech input (305) are added to the input buffer. The length of each batch (input frame) is, e.g., 20 milliseconds. When a frame is encoded, sample values for the frame are removed from the input buffer. Any unused sample values are retained in the input buffer for encoding as part of the next frame. Thus, the encoder system (300) is configured to buffer any unused sample values in a current batch (input frame) and prepend these sample values to the next batch (input frame) in the input buffer. Alternatively, the encoder system (300) can use uniform-length frames.

The filterbank (310) is configured to separate the speech input (305) into multiple bands. The multiple bands provide input values filtered by prediction filters (360, 362) to produce residual values in corresponding bands. In FIG. 3, the filterbank (310) is configured to separate the speech input (305) into two equal bands—a low band (311) and a high band (312). For example, if the speech input (305) is from a super-wideband input signal, the low band (311) can include speech in the range of 0-8 kHz, and the high band (312) can include speech in the range of 8-16 kHz. Alternatively, the filterbank (310) splits the speech input (305) into more bands and/or unequal bands. The filterbank (310) can use any of various types of Infinite impulse Response ("IIR") or other filters, depending on implementation.

The filterbank (310) can be selectively bypassed. For example, in the encoder system (300) of FIG. 3, if the speech input (305) is from a wideband input signal, the filterbank (310) can be bypassed. In this case, subsequent processing of the high band (312) by the high-band LPC analysis module (322), high-band prediction filter (362), framer (370), residual encoder (380), etc. can be skipped, and the speech input (300) directly provides input values filtered by the prediction filter (360).

The encoder system (300) of FIG. 3 includes two linear prediction coding ("LPC") analysis modules (320, 322), which are configured to determine LP coefficients for the respective bands (311, 312). In some example implementations, each of the LPC analysis modules (320, 322) computes whitening coefficients using a look-ahead window of five milliseconds. Alternatively, the LPC analysis modules (320, 322) are configured to determine LP coefficients in some other way. If the filterbank (310) splits the speech input (305) into more bands (or is omitted), the encoder system (300) can include more LPC analysis modules for the respective bands. If the filterbank (310) is bypassed (or omitted), the encoder system (300) can include a single LPC analysis module (360) for a single band—all of the speech input (305).

The LP coefficient quantization module (325) is configured to quantize the LP coefficients, producing quantized LP coefficients (327, 328) for the respective bands (or all of the speech input (305), if the filterbank (310) is bypassed or omitted). Depending on implementation, the LP coefficient quantization module (325) can use any of various combinations of quantization operations (e.g., vector quantization, scalar quantization), prediction operations, and domain conversion operations (e.g., conversion to the line spectral frequency ("LSF") domain) to quantize the LP coefficients.

The encoder system (300) of FIG. 3 includes two prediction filters (360, 362), e.g., whitening filters A(z). The prediction filters (360, 362) are configured to filter input values, which are based on the speech input, according to the quantized LP coefficients (327, 328). The filtering produces residual values (367, 368). In FIG. 3, the low-band prediction filter (360) is configured to filter input values in the low band (311) according to the quantized LP coefficients (327) for the low band (311), or filter input values directly from the speech input (305) according to the quantized LP coefficients (327) if the filterbank (310) is bypassed or omitted, producing (low-band) residual values (367). The high-band prediction filter (362) is configured to filter input values in the high band (312) according to the quantized LP coefficients (328) for the high band (312), producing high-band residual values (368). If the filterbank (310) is configured to split the speech input (305) into more bands, the encoder system (300) can include more prediction filters for the respective bands. If the filterbank (310) is omitted, the encoder system (300) can include a single prediction filter for the entire range of speech input (305).

The pitch analysis module (330) is configured to perform pitch analysis, thereby producing pitch cycle information (336). In FIG. 3, the pitch analysis module (330) is configured to process the low band (311) of the speech input (305) in parallel with LPC analysis. Alternatively, the pitch analysis module (330) can be configured to process other information, e.g., the speech input (305). Essentially, the pitch analysis module (330) determines a sequence of pitch cycles such that the correlation between pairs of neighboring cycles is maximized. The pitch cycle information (336) can be, for example, a set of subframe lengths corresponding to pitch cycles, or some other type of information about pitch cycles in the input to the pitch analysis module (330). The pitch analysis module (330) can also be configured to produce a correlation value. The pitch quantization module (335) is configured to quantize the pitch cycle information (336).

The voicing decision module (340) is configured to perform voicing analysis, thereby producing voicing decision information (346). Residual values (367, 368) are encoded using a model adapted for voiced speech content or a model adapted for unvoiced speech content. The voicing decision module (340) is configured to determine which model to use. Depending on implementation, the voicing decision module (340) can use any of various criteria to determine which model to use. In the encoder system (300) of FIG. 3, on a frame-by-frame basis, the voicing decision information (346) indicates whether the residual encoder (380) should encode a frame of the residual values (367, 368) as voiced speech content or unvoiced speech content. Alternatively, the voicing decision module (340) produces voicing decision information (346) according to other timing.

The framer (370) is configured to organize the residual values (367, 368) as variable-length frames. In particular, the framer (370) is configured to set a framing strategy (voiced or unvoiced) based at least in part on voicing decision information (346), then set the frame length for a current frame of the residual values (367, 368) and set subframe lengths for subframes of the current frame based at least in part on the pitch cycle information (336) and the residual values (367, 368). In the bitstream (395), some parameters are signaled per subframe, while other parameters are signaled per frame. In some example implementations, the framer (370) reviews residual values (367, 368) for a current batch of speech input (305) (and any leftover from a previous batch) in the input buffer.

If the framing strategy is voiced, the framer (370) is configured to set the subframe lengths based at least in part on pitch cycle information, such that each of the subframes includes sets of the residual values (367, 368) for one pitch period. This facilitates coding in a pitch-synchronous manner. (Using pitch-synchronous subframes can facilitate packet loss concealment, as such operations typically generate an integer count of pitch cycles. Similarly, using pitch-synchronous subframes can facilitate time-compressing stretch operations, as such operations typically remove an integer count of pitch cycles.)

The framer (370) is also configured to set the frame length of a current frame to an integer count of subframes from 1 to w, where w depends on implementation (e.g., corresponding to a smallest subframe length of two milliseconds or some other count of milliseconds). In some example implementations, the framer (370) is configured to set subframe lengths to encode an integer count of pitch cycles per frame, packing as many subframes as possible into the current frame while having a single pitch period per subframe. For example, if the pitch period is four milliseconds, the current frame includes five pitch periods of residual values (367, 368), for a 20-millisecond frame length. As another example, if the pitch period is six milliseconds, the current frame includes three pitch periods of residual values (367, 368), for an 18-millisecond frame length. In practice, the frame length is limited by the look-ahead window of the framer (370) (e.g., 20 milliseconds of residual values for a new batch plus any leftover from a previous batch).

Subframe lengths are quantized. In some example implementations, for a voiced frame, subframe lengths are quantized to have an integer length for signals sampled at 32 kHz, and the sum of the subframe lengths has an integer length for signals sampled at 8 kHz. Thus, subframes have a length that is a multiple of 1/32 millisecond, and a frame has a length that is a multiple of %4 millisecond. Alternatively, subframes and frames of voiced content can have other lengths.

If the framing strategy if unvoiced, the framer (370) is configured to set the frame length for a frame and subframe lengths for subframes of the frame according to a different approach, which can be adapted for unvoiced content. For example, frame length can have a uniform or dynamic size, and subframe lengths can be equal or variable for subframes.

In some example implementations, average frame length is around 20 milliseconds, although the lengths of individual frames may vary. Using variable-size frames can improve coding efficiency, simplify codec design, and facilitate coding each frame independently, which may help a speech decoder with packet loss concealment and time scale modification.

Any residual values that are not included in the subframe(s) of a frame are left over for encoding in the next frame. Thus, the framer (370) is configured to buffer any unused residual values and prepend these to the next frame of residual values. The framer (370) can receive new pitch cycle information (336) and voicing decision information (346), then make decisions about frame/subframe lengths and framing strategy for the next frame.

Alternatively, the framer (370) is configured to organize the residual values (367, 368) as variable-length frames using some other approach.

Figure 4:
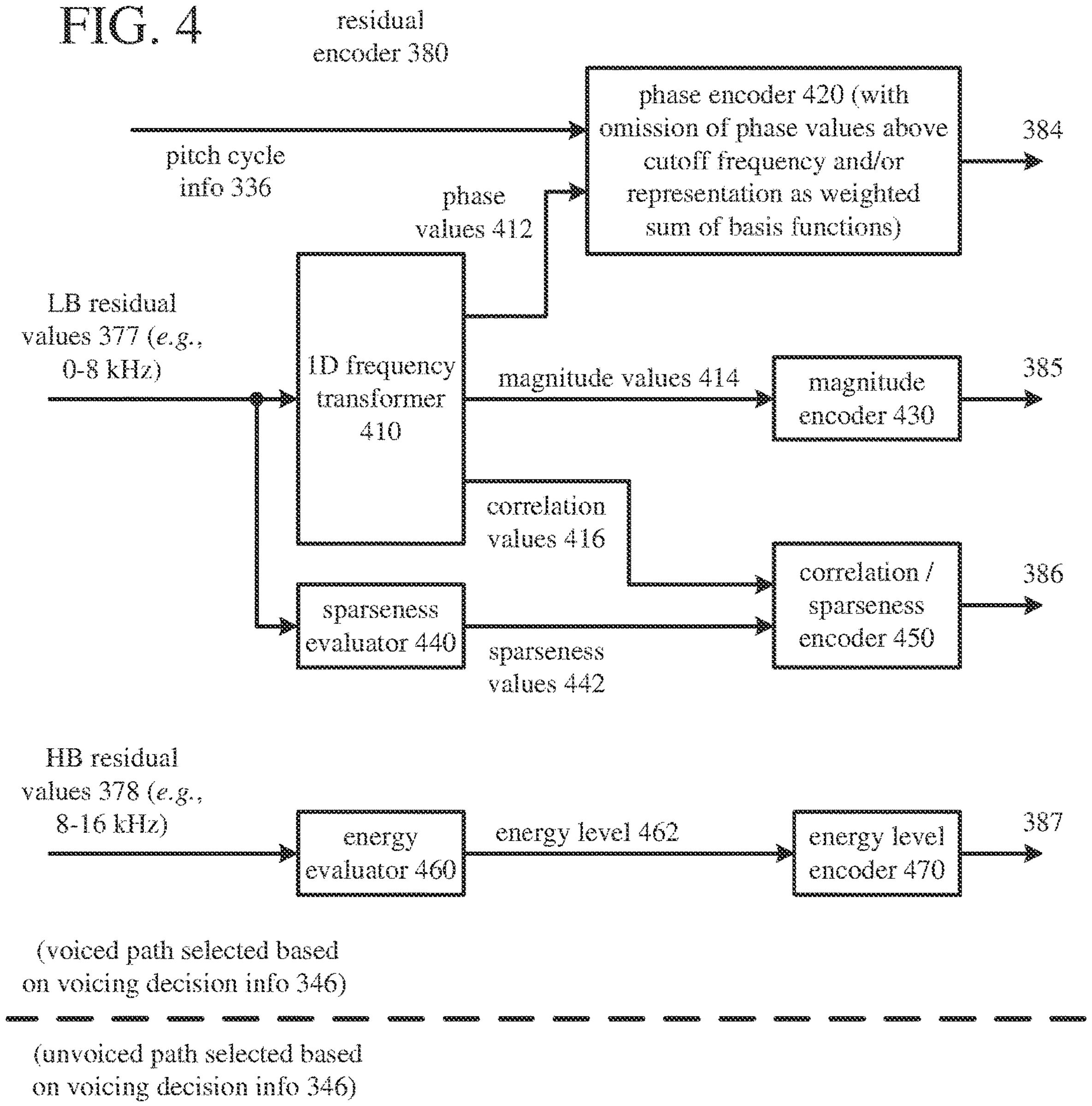
FIG. 4 is a diagram illustrating stages of encoding of residual values in the example speech encoder system of FIG. 3.

The residual encoder (380) is configured to encode the residual values (367, 368). FIG. 4 shows stages of encoding of residual values (367, 368) in the residual encoder (380), which includes stages of encoding in a path for voiced speech and stages of encoding in a path for unvoiced speech. The residual encoder (380) is configured to select one of the paths based on the voicing decision information (346), which is provided to the residual encoder (380).

If the residual values (377, 378) are for voiced speech, the residual encoder (380) includes separate processing paths for residual values in different bands. In FIG. 4, low-band residual values (377) and high-band residual values (378) are mostly encoded in separate processing paths. If the filterbank (310) is bypassed or omitted, residual values (377) for the entire range of speech input (305) are encoded. In any case, for the low band (or speech input (305) if the filterbank (310) is bypassed or omitted), the residual values (377) are encoded in a pitch-synchronous manner, since a frame has been divided into subframes each containing one pitch cycle.

The frequency transformer (410) is configured to apply a one-dimensional ("1D") frequency transform to one or more subframes of the residual values (377), thereby producing complex amplitude values for the respective subframes. In some example implementations, the 1D frequency transform is a variation of Fourier transform (e.g., Discrete Fourier Transform ("DFT"), Fast Fourier Transform ("FFT")) without overlap or, alternatively, with overlap. Alternatively, the 1D frequency transform is some other frequency transform that produces frequency domain values from the residual values (377) of the respective subframes. In general, the complex amplitude values for a subframe include, for each frequency in a range of frequencies, (1) a real value representing an amplitude of cosine at the frequency and (2) an imaginary value representing an amplitude of sine at the frequency). Thus, each frequency bin contains the complex amplitude values for one harmonic. For a perfectly periodic signal, the complex amplitude values in each bin stay constant across subframes. If subframes are stretched or compressed versions of each other, the complex amplitude values stay constant as well. The lowest bin (at 0 Hz) can be ignored, and set to zero in a corresponding residual decoder.

The frequency transformer (410) is further configured to determine sets of magnitude values (414) for the respective subframes and one or more sets of phase values (412), based at least in part on the complex amplitude values for the respective subframes. For a frequency, a magnitude value represents the amplitude of combined cosine and sine at the frequency, and a phase value represents the relative proportions of cosine and sine at the frequency. In the residual encoder (380), the magnitude values (414) and phase values (412) are further encoded separately.

The phase encoder (420) is configured to encode the one or more sets of phase values (412), producing quantized parameters (384) for the set(s) of phase values (412). The set(s) of phase values may be for the low band (311) or entire range of speech input (305). The phase encoder (420) can encode a set of phase values (412) per subframe or a set of phase values (412) for a frame. In this case, the complex amplitude values for subframes of the frame can be averaged or otherwise aggregated, and a set of phase values (412) for the frame can be determined from the aggregated complex amplitude values. Section IV explains operations of the phase encoder (420) in detail. In particular, the phase encoder (420) can be configured to perform operations to omit any of a set of phase values (412) having a frequency above a cutoff frequency. The cutoff frequency can be selected based at least in part on a target bitrate for the encoded data, pitch cycle information (336) from the pitch analysis module (330), and/or other criteria. Further, the phase encoder (420) can be configured to perform operations to represent at least some of a set of phase values (412) using a linear component in combination with a weighted sum of basis functions. In this case, the phase encoder (420) can be configured to perform operations to use a delayed decision approach to determine a set of coefficients that weight the basis functions, set a count of coefficients that weight the basis functions (based at least in part on a target bitrate for the encoded data), and/or use a cost function based at least in part on linear phase measure to determine a score for a candidate set of coefficients that weight the basis functions.

The magnitude encoder (430) is configured to encode the sets of magnitude values (414) for the respective subframes, producing quantized parameters (385) for the sets of magnitude values (414). Depending on implementation, the magnitude encoder (430) can use any of various combinations of quantization operations (e.g., vector quantization, scalar quantization), prediction operations, and domain conversion operations (e.g., conversion to the frequency domain) to encode the sets of magnitude values (414) for the respective subframes.

The frequency transformer (410) can also be configured to produce correlation values (416) for the residual values (377). The correlation values (416) provide a measure of the general character of the residual values (377). In general, the correlation values (416) measure correlations for complex amplitude values across subframes. In some example implementations, correlation values (416) are cross-correlations measured at three frequency bands: 0-1.2 kHz, 1.2-2.6 kHz and 2.6-5 kHz. Alternatively, correlation values (416) can be measured in more or fewer frequency bands.

The sparseness evaluator (440) is configured to produce a sparseness value (442) for the residual values (377), which provides another measure of the general character of the residual values (377). In general, the sparseness value (442) quantifies the extent to which energy is spread in the time domain among the residual values (377). Stated differently, the sparseness value (442) quantifies the proportion of energy distribution in the residual values (377). If there are few non-zero residual values, the sparseness value is high. If there are many non-zero residual values, the sparseness value is low. In some example implementations, the sparseness value (442) is the ratio of mean absolute value to root-mean-square value of the residual values (377). The sparseness value (442) can be computed in the time domain per subframe of the residual values (377), then averaged or otherwise aggregated for the subframes of a frame. Alternatively, the sparseness value (442) can be calculated in some other way (e.g., as a percentage of non-zero values).

The correlation/sparseness encoder (450) is configured to encode the sparseness value (442) and the correlation values (416), producing one or more quantized parameters (386) for the sparseness value (442) and the correlation values (416). In some example implementations, the correlation values (416) and sparseness value (442) are jointly vector quantized per frame. The correlation values (416) and sparseness value (442) can be used at a speech decoder when reconstructing high-frequency information.

For the high-band residual values (377) of voiced speech, the encoder system (300) relies on decoder reconstruction through bandwidth extension, as described below. High-band residual values (378) are processed in a separate path in the residual encoder (380). The energy evaluator (460) is configured to measure a level of energy for the high-band residual values (378), e.g., per frame or per subframe. The energy level encoder (470) is configured to quantize the high-band energy level (462), producing a quantized energy level (387).

If the residual values (377, 378) are for unvoiced speech, the residual encoder (380) includes one or more separate processing paths (not shown) for residual values. Depending on implementation, the unvoiced path in the residual encoder (380) can use any of various combinations of filtering operations, quantization operations (e.g., vector quantization, scalar quantization) and energy/noise estimation operations to encode the residual values (377, 378) for unvoiced speech.

In FIGS. 3 and 4, the residual encoder (380) is shown processing low-band residual values (377) and high-band residual value (378). Alternatively, the residual encoder (380) can process residual values in more bands or a single band (e.g., if filterbank (310) is bypassed or omitted).

Returning to the encoder system (300) of FIG. 3, the one or more entropy coders (390) are configured to entropy code parameters (327, 328, 336, 346, 384-389) generated by other components of the encoder system (300). For example, quantized parameters generated by other components of the encoder system (300) can be entropy coded using a range coder that uses cumulative mass functions that represent the probabilities of values for the quantized parameters being encoded. The cumulative mass functions can be trained using a database of speech signals with varying levels of background noise. Alternatively, parameters (327, 328, 336, 346, 384-389) generated by other components of the encoder system (300) are entropy coded in some other way.

In conjunction with the entropy coder(s), the multiplexer ("MUX") (391) multiplexes the entropy coded parameters into the bitstream (395). An output buffer, implemented in memory, is configured to store the encoded data for output as part of the bitstream (395). In some example implementations, each packet of encoded data for the bitstream (395) is coded independently, which helps avoid error propagation (the loss of one packet affecting the reconstructed speech and voice quality of subsequent packets), but may contain encoded data for multiple frames (e.g., three frames or some other count of frames). When a single packet contains multiple frames, the entropy coder(s) (390) can use conditional coding to boost coding efficiency for the second and subsequent frames in the packet.

The bitrate of encoded data produced by the encoder system (300) depends on the speech input (305) and on the target bitrate. To adjust the average bitrate of the encoded data so that it matches the target bitrate, a rate controller (not shown) can compare the recent average bitrate to the target bitrate, then select among multiple encoding profiles. The selected encoding profile can be indicated in the bitstream (395). An encoding profile can define bits allocated to different parameters set by the encoder system (300). For example, an encoding profile can define a phase quantization cutoff frequency, a count of coefficients used to represent a set of phase values as a weighted sum of basis functions (as a fraction of complex amplitude values), and/or another parameter.

Depending on implementation and the type of compression desired, modules of the encoder system (300) can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder system (300). The relationships shown between modules within the encoder system (300) indicate general flows of information in the encoder system (300); other relationships are not shown for the sake of simplicity.

IV. Examples of Phase Quantization in a Speech Encoder

This section describes innovations in phase quantization during speech encoding. In many cases, the innovations can improve the performance of a speech codec in low bitrate scenarios, even when encoded data is delivered over a network that suffers from insufficient bandwidth or transmission quality problems. The innovations described in this section fall into two main sets of innovations, which can be used separately or in combination.

According to a first set of innovations, when a speech encoder encodes a set of phase values, the speech encoder quantizes and encodes only lower-frequency phase values, which are below a cutoff frequency. Higher-frequency phase values (above the cutoff frequency) are synthesized at a speech decoder based on at least some of the lower-frequency phase values. By omitting higher-frequency phase values (and synthesizing them during decoding based on lower-frequency phase values), the speech encoder can efficiently represent a full range of phase values, which can improve rate-distortion performance in low bitrate scenarios. The cutoff frequency can be predefined and unchanging. Or, to provide flexibility for encoding speech at different target bitrates or encoding speech with different characteristics, the speech encoder can select the cutoff frequency based at least in part on a target bitrate for the encoded data, pitch cycle information, and/or other criteria.

According to a second set of innovations, when a speech encoder encodes a set of phase values, the speech encoder represents at least some of the phase values using a linear component in combination with a weighted sum of basis functions. Using a linear component and a weighted sum of basis functions, the speech encoder can accurately represent phase values in a compact and flexible way, which can improve rate-distortion performance in low bitrate scenarios. Although the speech encoder can be implemented to use any of various cost functions when determining coefficients for the weighted sum, a cost function based on linear phase measure often results in a weighted sum of basis functions that closely resembles the represented phase values. Although the speech encoder can be implemented to use any of various approaches when determining coefficients for the weighted sum, a delayed decision approach often finds suitable coefficients in a computationally efficient manner. A count of coefficients that weight the basis functions can be predefined and unchanging. Or, to provide flexibility for encoding speech at different target bitrates, the count of coefficients can depend on target bitrate.

A. Omitting Higher-Frequency Phase Values, Setting Cutoff Frequency.

When encoding a set of phase values, a speech encoder can quantize and encode lower-frequency phase values, which are below a cutoff frequency, and omit higher-frequency phase values, which are above the cutoff frequency. The omitted higher-frequency phase values can be synthesized at a speech decoder based on at least some of the lower-frequency phase values.

The set of phase values that is encoded can be a set of phase values for a frame or a set of phase values for a subframe of a frame. If the set of phase values is for a frame, the set of phase values can be calculated directly from complex amplitude values for the frame. Or, the set of phase values can be calculated by aggregating (e.g., averaging) complex amplitude values of subframes of the frame, then calculating the phase values for the frame from the aggregated complex amplitude values. For example, to quantize a set of phase values for a frame, a speech encoder determines the complex amplitude values for the subframes of the frame, averages the complex amplitude values for the subframes, and then calculates the phase values for the frame from the averaged complex amplitude values for the frame.

When omitting higher-frequency phase values, the speech encoder discards phase values above a cutoff frequency. The higher-frequency phase values can be discarded after the phase values are determined. Or, the higher-frequency phase values can be discarded by discarding complex amplitude values (e.g., averaged complex amplitude values) above the cutoff frequency and never determining the corresponding higher-frequency phase values. Either way, the phase values above the cutoff frequency are discarded and hence omitted from the encoded data in the bitstream.

Although a cutoff frequency can be predefined and unchanging, there are advantages to changing the cutoff frequency adaptively. For example, to provide flexibility for encoding speech at different target bitrates or encoding speech with different characteristics, the speech encoder can select a cutoff frequency based at least in part on a target bitrate for the encoded data and/or pitch cycle information, which can indicate average pitch frequency.

Typically, information in a speech signal is conveyed at a fundamental frequency and some multiples (harmonics) of it. The speech encoder can set the cutoff frequency so that important information is kept. For example, if a frame includes high-frequency speech content, the speech encoder sets a higher cutoff frequency in order to preserve more phase values for the frame. On the other hand, if a frame includes only low-frequency speech content, the speech encoder sets a lower cutoff frequency in order to save bits. In this way, in some example implementations, the cutoff frequency can fluctuate in a way that compensates for loss of information due to averaging of the complex amplitude values of subframes. If the frame includes high-frequency speech content, the pitch period is short, and complex amplitude values for many subframes are averaged. The average values might not be representative of the values in a particular one of the subframes. Because information may already be lost due to averaging, the cutoff frequency is higher, so as to preserve the information that remains. On the other hand, if the frame includes low-frequency speech content, the pitch period is longer, and complex amplitude values for fewer subframes are averaged. Because there tends to be less information loss due to averaging, the cutoff frequency can be lower, while still having sufficient quality.

With respect to target bitrate, if target bitrate is lower, the cutoff frequency is lower. If target bitrate is higher, the cutoff frequency is higher. In this way, the bits allocated to representing higher-frequency phase values can vary directly in proportion to available bitrate.

In some example implementations, the cutoff frequency falls within the range of 962 Hz (for a low target bitrate and low average pitch frequency) to 4160 Hz (for a high target bitrate and high average pitch frequency). Alternatively, the cutoff frequency can vary within some other range.

The speech encoder can set the cutoff frequency on a frame-by-frame basis. For example, the speech encoder can set the cutoff frequency for a frame as average pitch frequency changes from frame-to-frame, even if target bitrate (e.g., set in response to network conditions reported to the speech encoder by some component outside the speech encoder) changes less often. Alternatively, the cutoff frequency can change on some other basis.

The speech encoder can set the cutoff frequency using a lookup table that associates different cutoff frequencies with different target bitrates and average pitch frequencies. Or, the speech encoder can set the cutoff frequency according to rules, logic, etc. in some other way. The cutoff frequency can similarly be derived at a speech decoder based on information the speech decoder has about target bitrate and pitch cycles.

Depending on implementation, a phase value exactly at the cutoff frequency can be treated as one of the higher-frequency phase values (omitted) or as one of the lower-frequency phase values (quantized and encoded).

B. Using a Weighted Sum of Basis Functions to Represent Phase Values.

When encoding a set of phase values, a speech encoder can represent the set of phase values as a weighted sum of basis functions. For example, when the basis functions are sine functions, a quantized set of phase values $P_i$ is defined as:

$$P_i = 0.6 \cdot \sum_{n=1}^{N} \sin\left(\frac{\pi n(i+0.5)}{I}\right) K_n, \text{ for } 0 \le i \le I-1,$$

where N is the count of quantization coefficients (hereafter, "coefficients") that weight the basis functions, $K_n$ is one of the coefficients, and I is the count of complex amplitude values (and hence frequency bins having phase values). In some example implementations, the basis functions are sine functions, but the basis functions can instead be cosine functions or some other type of basis functions. The set of phase values can be lower-frequency phase values (after discarding higher-frequency phase values as described in the previous section), a full range of phase values (if higher-frequency phase values are not discarded), or some other range of phase values. The set of phase values that is encoded can be a set of phase values for a frame or a set of phase values for a subframe of a frame, as described in the previous section.

A final quantized set of phase values $P_{final\_i}$ is defined using the quantized set of phase values $P_i$ (the weighted sum of basis functions) and a linear component. The linear component can be defined as a×i+b, where a represents a slope value, and where b represents an offset value. For example, $P_{final\_i}=P_i+a\times i+b$. Alternatively, the linear component can be defined using other and/or additional parameters.

To encode the set of phase values, the speech encoder finds a set of coefficients $K_n$ that results in a weighted sum of basis functions that resembles the set of phase values. To limit computational complexity when determining set of coefficients $K_n$, the speech encoder can limit possible values for the set of coefficients $K_n$. For example, the values for the coefficients $K_n$ are integer values limited in magnitude as follows.

$$|K_n| \le 5, \text{ if } n=1$$

$$|K_n| \le 3, \text{ if } n=2$$

$$|K_n| = \le 2, \text{ if } n=3$$

$$|K_n| \le 1, \text{ if } n \ge 4.$$

The values of $K_n$ are quantized as integer values. Alternatively, the values for the coefficients $K_n$ can be limited according to other constraints.

Although the count N of coefficients $K_n$ can be predefined and unchanging, there are advantages to changing the count N of coefficients $K_n$ adaptively. To provide flexibility for encoding speech at different target bitrates, the speech encoder can select a count N of coefficients $K_n$ based at least in part on a target bitrate for the encoded data. For example, depending on target bitrate, the speech encoder can set the count N of coefficients $K_n$ as a fraction of the count I of complex amplitude values (and hence frequency bins having phase values). In some example implementations, the fraction ranges from 0.29 to 0.51. Alternatively, the fraction can have some other range. If the target bitrate is high, the count N of coefficients $K_n$ is high (there are more coefficients $K_n$). If the target bitrate is low, the count N of coefficients $K_n$ is low (there are fewer coefficients $K_n$). The speech encoder can set the count N of coefficients $K_n$, using a lookup table that associates different coefficient counts with different target bitrates. Or, the speech encoder can set the count N of coefficients $K_n$ according to rules, logic, etc. in some other way. The count N of coefficients $K_n$ can similarly be derived at a speech decoder based on information the speech decoder has about target bitrate. The count N of coefficients $K_n$ can also depend on average pitch frequency. The speech encoder can set the count N of coefficients $K_n$ on a frame-by-frame basis, e.g., as average pitch frequency changes, or on some other basis.

When evaluating options for coefficients $K_n$, the speech encoder uses a cost function (fitness function). The cost function depends on implementation. Using the cost function, the speech encoder determines a score for a candidate set of coefficients $K_n$ that weight the basis functions. The cost function can also account for values of other parameters. For example, for one type of cost function, the speech encoder reconstructs a version of a set of phase values by weighting the basis functions according to a candidate set of coefficients $K_n$, then calculates a linear phase measure when applying an inverse of the reconstructed version of the set of phase values to complex amplitude values. In other words, this cost function for coefficients $K_n$ is defined such that applying the inverse of the quantized phase signal $P_i$ to the (original) averaged complex spectrum results in a spectrum that is maximally linear phase. This linear phase measure is the peak magnitude value of the inverse Fourier transform. If the result is perfectly linear phase, then the quantized phase signal exactly matches that of the averaged complex spectrum. For example, when $P_{final\_i}$ is defined as $P_i+a\times i+b$, maximizing linear phase means maximizing how well the linear component a×i+b represents the residual of the phase values. Alternatively, the cost function can be defined in some other way.

In theory, a speech encoder can perform a full search across the parameter space for possible values of coefficients $K_n$. In practice, a full search is too computationally complex for most scenarios. To reduce computational complexity, a speech encoder can use a delayed decision approach (e.g., Viterbi algorithm) when finding a set of coefficients $K_n$ to weight basis functions to represent a set of phase values.

In general, for the delayed decision approach, the speech encoder performs operations iteratively to find values of coefficients $K_n$ in multiple stages. For a given stage, the speech encoder evaluates multiple candidate values of a given coefficient, among of the coefficients $K_n$, that is associated with the given stage. The speech encoder evaluates the candidate values according to a cost function, assessing each candidate value for the given coefficient in combination with each of a set of candidate solutions from a previous stage, if any. The speech encoder retains, as a set of candidate solutions from the given stage, some count of the evaluated combinations based at least in part on scoring according to the cost function. For example, for a given stage n, the speech encoder retains the top three combinations of values for coefficients $K_n$ through the given stage. In this way, using the delayed decision approach, the speech encoder tracks the most promising sequences of coefficients $K_n$.

Figure 5:
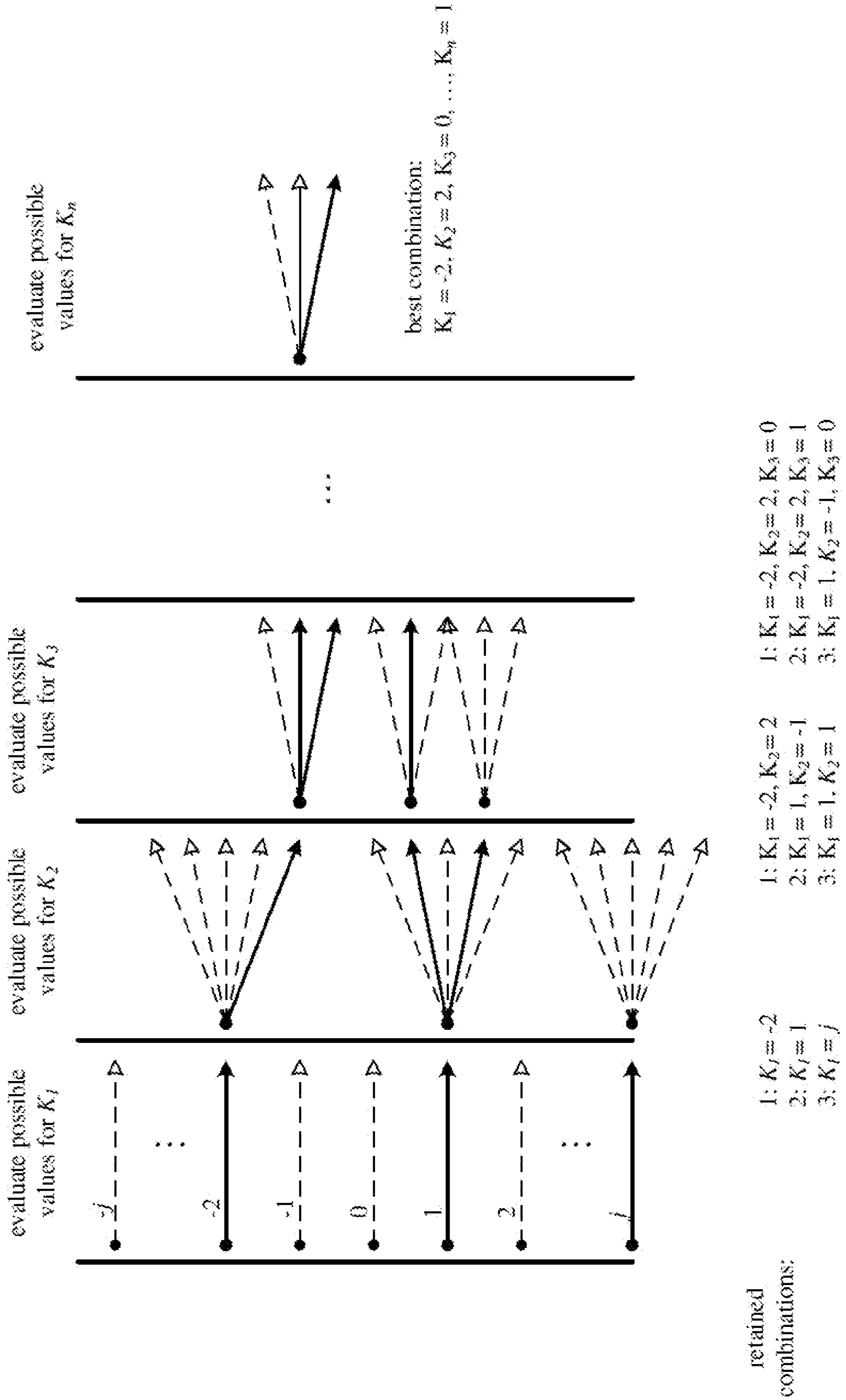
FIG. 5 is a diagram illustrating an example delayed decision approach for finding coefficients to represent phase values as a weighted sum of basis functions.

FIG. 5 shows an example (500) of a speech encoder using a delayed decision approach to find coefficients to represent a set of phase values as a weighted sum of basis functions. To determine a set of coefficients $K_n$, the speech encoder iterates over n=1 . . . N. At each stage (for each value of n), the speech encoder tests all allowed values of $K_n$ according to the cost function. For example, for a linear phase measure cost function, the speech encoder generates a new phase signal $P_i$ according to the combinations of coefficients $K_n$, and measures how linear phase the result is. Instead of evaluating all possible permutations of values for the coefficients $K_n$ (that is, each possible value at stage 1×each possible value at stage 2× . . . × each possible value at stage n), the speech encoder evaluates a subset of the possible permutations. Specifically, the speech encoder checks all possible values for a coefficient $K_n$ at stage n when chained to each of the retained combinations from stage n−1. The retained combinations from stage n−1 include the most promising combinations of coefficients $K_0$, $K_1$, . . . . $K_{n-1}$ through stage n−1. The count of retained combinations depends on implementation. For example, the count is two, three, five, or some other count. The count of combinations that are retained can be the same at each stage or different in different stages.

In the example shown in FIG. 5, for the first stage, the speech encoder evaluates each possible value of $K_1$ from −j to j (2j+1 possible integer values), and retains the top three combinations according to the cost function (best $K_1$ values at the first stage). For the second stage, the speech encoder evaluates each possible value of $K_2$ from −2 to 2 (five possible integer values) chained to each of the retained combinations (best $K_1$ values from the first stage), and retains the top three combinations according to the cost function (best $K_1+K_2$ combinations at the second stage). For the third stage, the speech encoder evaluates each possible value of $K_3$ from −1 to 1 (three possible integer values) chained to each of the retained combinations (best $K_1+K_2$ combinations from the second stage), and retains the top three combinations according to the cost function (best $K_1+K_2+K$ combinations at the third stage). This process continues through n stages. In the final stage, the speech encoder evaluates each possible value of $K_n$ from −1 to 1 (three possible integer values) chained to each of the retained combinations (best $K_1+K_2+K_3+ \ldots +K_{n-1}$ combinations from stage n−1), and selects the best combination according to the cost function (best $K_1+K_2+K_3+ \ldots + K_{n-1}+K_n$). The delayed decision approach makes the process of finding values for the coefficients $K_n$ tractable, even when N is 50, 60, or even higher.

In addition to finding the set of coefficients $K_n$, the speech encoder determines parameters for the linear component. For example, the speech decoder determines a slope value a and an offset value b. The offset value b indicates a linear phase (offset) to the start of the weighted sum of basis functions, so that the result $P_{final\_i}$ more closely approximates the original phase signal. The slope value a indicates an overall slope, applied as a multiplier or scaling factor, for the linear component, so that the result $P_{final\_i}$ more closely approximates the original phase signal. The speech encoder can uniformly quantize the offset value and slope value. Or, the speech encoder can jointly quantize the offset value and slope value, or encode the offset value and slope value in some other way. Alternatively, the speech encoder can determine other and/or additional parameters for the linear component or weighted sum of basis functions.

Finally, the speech encoder entropy codes the set of coefficients $K_n$, offset value, slope value, and/or other value(s), which have been quantized. A speech decoder can use the set of coefficients $K_n$, offset value, slope value, and/or other value(s) to generate an approximation of the set of phase values.

C. Example Techniques for Phase Quantization in Speech Encoding

Figure 6A:
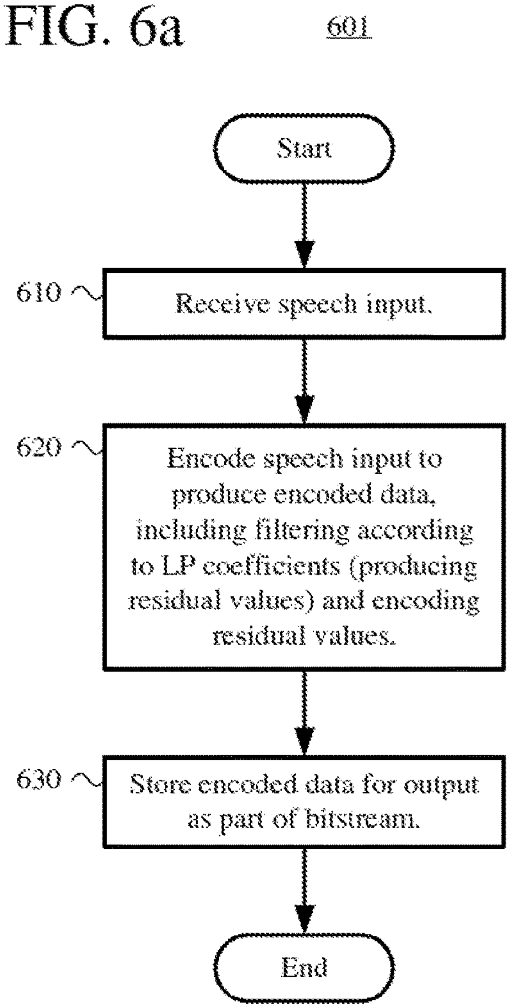
FIGS. 6*a*-6*d* are flowcharts illustrating techniques for speech encoding that includes representing phase values as a weighted sum of basis functions and/or omitting phase values having a frequency above a cutoff frequency.
Figure 6B:
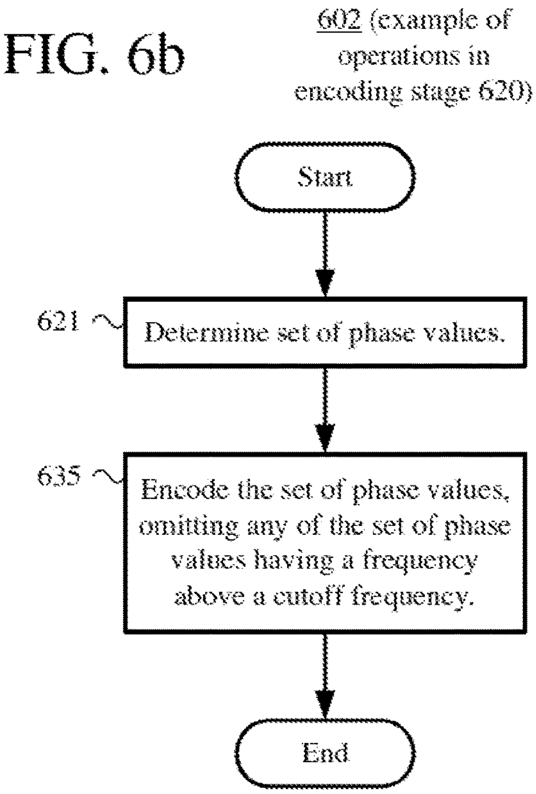
Figure 6C:
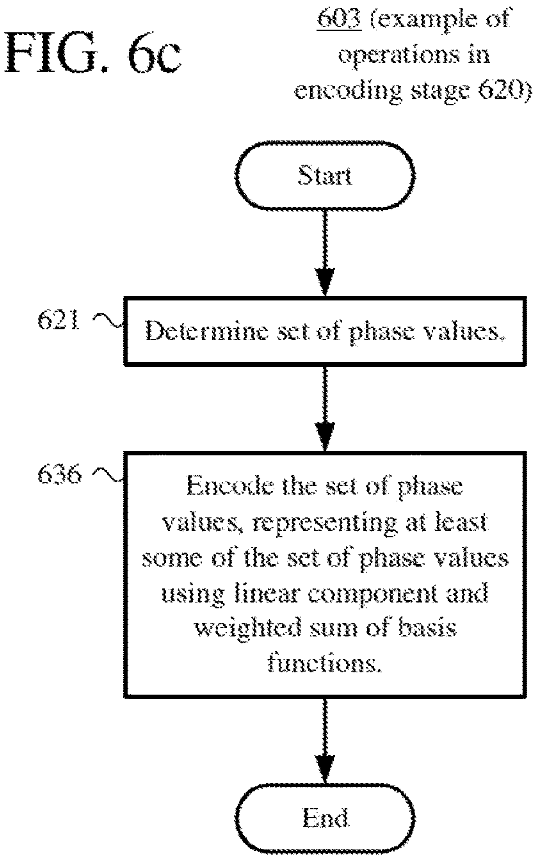
Figure 6D:
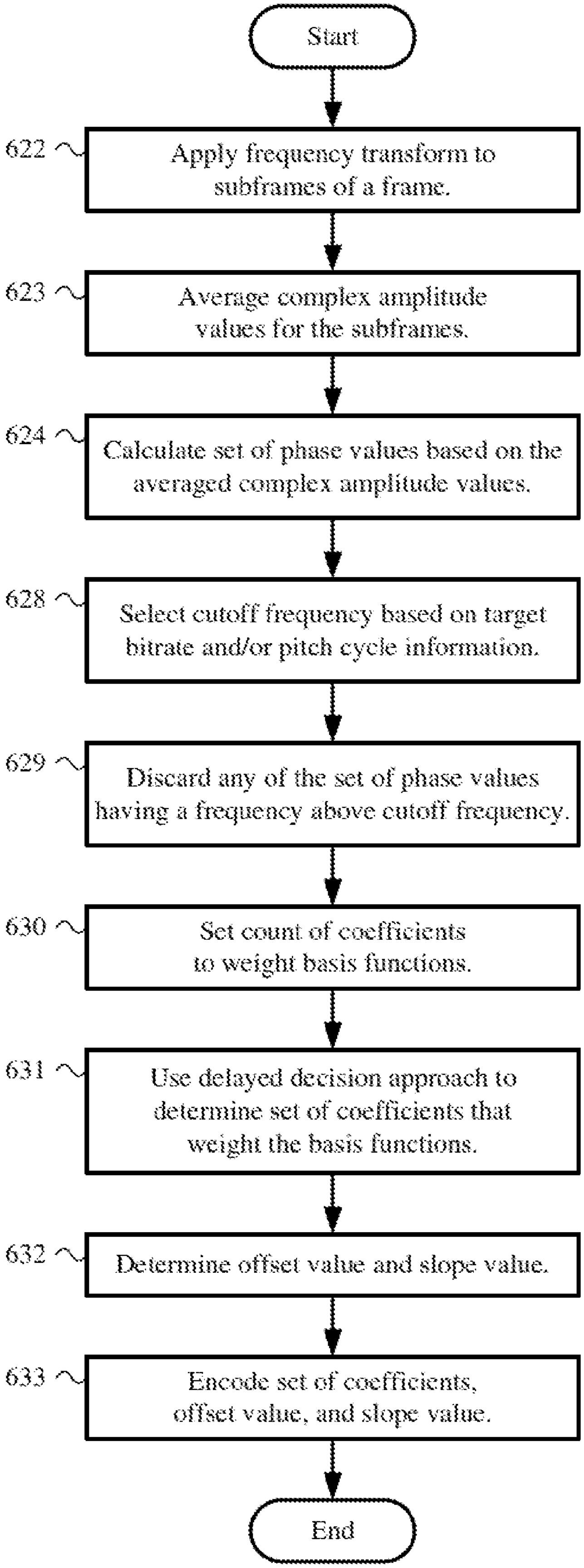

FIG. 6*a* shows a generalized technique (601) for speech encoding, which can include additional operations as shown in FIG. 6*b*, FIG. 6*c*, or FIG. 6*d*. FIG. 6*b* shows a generalized technique (602) for speech encoding that includes omitting phase values having a frequency above a cutoff frequency. FIG. 6*c* shows a generalized technique (603) for speech encoding that includes representing phase values using a linear component and a weighted sum of basis functions. FIG. 6*d* shows a more specific example technique (604) for speech encoding that includes omitting higher-frequency phase values (which are above a cutoff frequency) and representing lower-frequency phase values (which are below the cutoff frequency) as a weighted sum of basis functions. The techniques (601-604) can be performed by a speech encoder as described with reference to FIGS. 3 and 4 or by another speech encoder.

With reference to FIG. 6*a*, the speech encoder receives (610) speech input. For example, an input buffer implemented in memory of a computer system is configured to receive and store the speech input.

The speech encoder encodes (620) the speech input to produce encoded data. As part of the encoding (620), the speech encoder filters input values based on the speech input according to LP coefficients. The input values can be, for example, bands of speech input produced by a filterbank. Alternatively, the input values can be the speech input that was received by the speech encoder. In any case, the filtering produces residual values, which the speech encoder encodes. FIGS. 6*b*-6*d* show examples of operations that can be performed as part of the encoding (620) stage for residual values.

The speech encoder stores (640) the encoded data for output as part of a bitstream. For example, an output buffer implemented in memory of the computer system stores the encoded data for output.

With reference to FIG. 6*b*, the speech encoder determines (621) a set of phase values for residual values. The set of phase values can be for a subframe of residual values or for a frame of residual values. For example, to determine the set of phase values for a frame, the speech encoder applies a frequency transform to one or more subframes of the current frame, which produces complex amplitude values for the respective subframes. The frequency transform can be a variation of Fourier transform (e.g., DFT, FFT) or some other frequency transform that produces complex amplitude values. Then, the speech encoder averages or otherwise aggregates the complex amplitude values for the respective subframes. Alternatively, the speech encoder can aggregate the complex amplitude values for the subframes in some other way. Finally, the speech encoder calculates the set of phase values based at least in part on the aggregated complex amplitude values. Alternatively, the speech encoder determines the set of phase values in some other way, e.g., by applying a frequency transform to an entire frame, without splitting the current frame into subframes, and calculating the set of phase values from the complex amplitude values for the frame.

The speech encoder encodes (635) the set of phase values. In doing so, the speech encoder omits any of the set of phase values having a frequency above a cutoff frequency. The speech encoder can select the cutoff frequency based at least in part on a target bitrate for the encoded data, pitch cycle information, and/or other criteria. Phase values at frequencies above the cutoff frequency are discarded. Phase values at frequencies below the cutoff frequency are encoded, e.g., as described with reference to FIG. 6*c*. Depending on implementation, a phase value exactly at the cutoff frequency can be treated as one of the higher-frequency phase values (omitted) or as one of the lower-frequency phase values (quantized and encoded).

With reference to FIG. 6*c*, the speech encoder determines (621) a set of phase values for residual values. The set of phase values can be for a subframe of residual values or for a frame of residual values. For example, the speech encoder determines the set of phase values as described with reference to FIG. 6*b*.

The speech encoder encodes (636) the set of phase values. In doing so, the speech encoder represents at least some of the set of phase values using a linear component and a weighted sum of basis functions. For example, the basis functions are sine functions. Alternatively, the basis functions are cosine functions or some other type of basis function. The phase values represented as a weighted sum of basis functions can be lower-frequency phase values (if higher-frequency phase values are discarded), an entire range of phase values, or some other range of phase values.

To encode the set of phase values, the speech encoder can determine a set of coefficients that weight the basis functions and also determine an offset value and slope value that parameterize the linear component. The speech encoder can then entropy code the set of coefficients, the offset value, and the slope value. Alternatively, the speech encoder can encode the set of phase values using a set of coefficients that weight the basis functions along with some other combination of parameters that define the linear component (e.g., no offset value, or no slope value, or using other parameters). Or, in combination with a set of coefficients that weight the basis functions and the linear component, the speech encoder can use still other parameters to represent a set of phase values.

To determine the set of coefficients that weight the basis functions, the speech encoder can use a delayed decision approach (as described above) or another approach (e.g., a full search of the parameter space for the set of coefficients). When determining the set of coefficients that weight the basis functions, the speech encoder can use a cost function based on a linear phase measure (as described above) or another cost function. The speech encoder can set the count of coefficients that weight the basis functions based at least in part on target bitrate for the encoded data (as described above) and/or other criteria.

In the example technique (604) of FIG. 6*d*, when encoding a set of phase values for residual values, the speech encoder omits higher-frequency phase values having a frequency above a cutoff frequency and represents lower-frequency phase values as a weighted sum of basis functions.

The speech encoder applies (622) a frequency transform to one or more subframes of a frame, which produces complex amplitude values for the respective subframes. The frequency transform can be a variation of Fourier transform (e.g., DFT, FFT) or some other frequency transform that produces complex amplitude values. Then, the speech encoder averages (623) the complex amplitude values for the subframes of the frame. Next, the speech encoder calculates (624) a set of phase values for the frame based at least in part on the averaged complex amplitude values.

The speech encoder selects (628) a cutoff frequency based at least in part on a target bitrate for the encoded data and/or pitch cycle information. Then, the speech encoder discards (629) any of the set of phase values having a frequency above the cutoff frequency. Thus, phase values at frequencies above the cutoff frequency are discarded, but phase values at frequencies below the cutoff frequency are further encoded. Depending on implementation, a phase value exactly at the cutoff frequency can be treated as one of the higher-frequency phase values (discarded) or as one of the lower-frequency phase values (quantized and encoded).

To encode the lower-frequency phase values (that is, the phase values below the cutoff frequency), the speech encoder represents the lower-frequency phase values using a linear component and a weighted sum of basis functions. Based at least in part on the target bitrate for the encoded data, the speech encoder sets (630) a count of coefficients that weight basis functions. The speech encoder uses (631) a delayed decision approach to determine a set of coefficients that weight the basis functions. The speech encoder also determines (632) an offset value and a slope value, which parameterize the linear component. The speech encoder then encodes (633) the set of coefficients, the offset value, and the slope value.

The speech encoder can repeat the technique (604) shown in FIG. 6*d* on a frame-by-frame basis. A speech encoder can repeat any of the techniques (601-603) shown in FIGS. 6*a*-6*c* on a frame-by-frame basis or some other basis.

V. Example Speech Decoder Systems

FIG. 7 shows an example speech decoder system (700) in conjunction with which some described embodiments may be implemented. The decoder system (700) can be a general-purpose speech decoding tool capable of operating in any of multiple modes such as a low-latency mode for real-time communication, a transcoding mode, and a higher-latency mode for playing back media from a file or stream, or the decoder system (700) can be a special-purpose decoding tool adapted for one such mode. In some example implementations, the decoder system (700) can play back high-quality voice and audio over various types of connections, including connections over networks with insufficient bandwidth (e.g., low bitrate due to congestion or high packet loss rates) or transmission quality problems (e.g., due to transmission noise or high jitter). In particular, in some example implementations, the decoder system (700) operates in one of two low-latency modes, a low bitrate mode or a high bitrate mode. The low bitrate mode uses components as described with reference to FIGS. 7 and 8.

The decoder system (700) can be implemented as part of an operating system module, as part of an application library, as part of a standalone application, using GPU hardware, or using special-purpose hardware. Overall, the decoder system (700) is configured to receive encoded data as part of a bitstream (705), decode the encoded data to reconstruct speech, and store the reconstructed speech (775) for output. The decoder system (700) includes various components, which are implemented using one or more processors and configured to decode the encoded data to reconstruct speech.

The decoder system (700) temporarily stores encoded data in an input buffer, which is implemented in memory of the decoder system (700) and configured to receive the encoded data as part of a bitstream (705). From time to time, encoded data is read from the output buffer by the demultiplexer ("DEMUX") (711) and one or more entropy decoders (710). The decoder system (700) temporarily stores reconstructed speech (775) in an output buffer, which is implemented in memory of the decoder system (300) and configured to store the reconstructed speech (775) for output. Periodically, sample values in an output frame of reconstructed speech (775) are read from the output buffer. In some example implementation, for each packet of encoded data that arrives as part of the bitstream (705), the decoder system (700) decodes and buffers subframe parameters (e.g., performing entropy decoding operations, recovering parameter values) as soon as the packet arrives. When an output frame is requested from the decoder system (700), the decoder system (700) decodes one subframe at a time until enough output sample values of reconstructed speech (775) have been generated and stored in the output buffer to satisfy the request. This timing of decoding operations has some advantages. By decoding subframe parameters as a packet arrives, the processor load for decoding operations is reduced when an output frame is requested. This can reduce the risk of output buffer underflow (data not being available in time for playback, due to processing constraints) and permit tighter scheduling of operations. On the other hand, decoding of subframes "on demand" in response to a request increases the likelihood that packets have been received containing encoded data for those subframes. Alternatively, decoding operations of the decoder system (700) can follow different timing.

In FIG. 7, the decoder system (700) uses variable-length frames. Alternatively, the decoder system (700) can use uniform-length frames.

In some example implementations, the decoder system (700) can reconstruct super-wideband speech (from an input signal sampled at 32 kHz) or wideband speech (from an input signal sampled at 16 kHz). In the decoder system (700), if the reconstructed speech (775) is for a wideband signal, processing for the high band by the residual decoder (720), high-band synthesis filter (752), etc. can be skipped, and the filterbank (760) can be bypassed.

In the decoder system (700), the DEMUX (711) is configured to read encoded data from the bitstream (705) and parse parameters from the encoded data. In conjunction with the DEMUX (711), one or more entropy decoders (710) are configured to entropy decode the parsed parameters, producing quantized parameters (712, 714-719, 737, 738) used by other components of the decoder system (700). For example, parameters decoded by the entropy decoder(s) (710) can be entropy decoded using a range decoder that uses cumulative mass functions that represent the probabilities of values for the parameters being decoded. Alternatively, quantized parameters (712, 714-719, 737, 738) decoded by the entropy decoder(s) (710) are entropy decoded in some other way.

Figure 8:
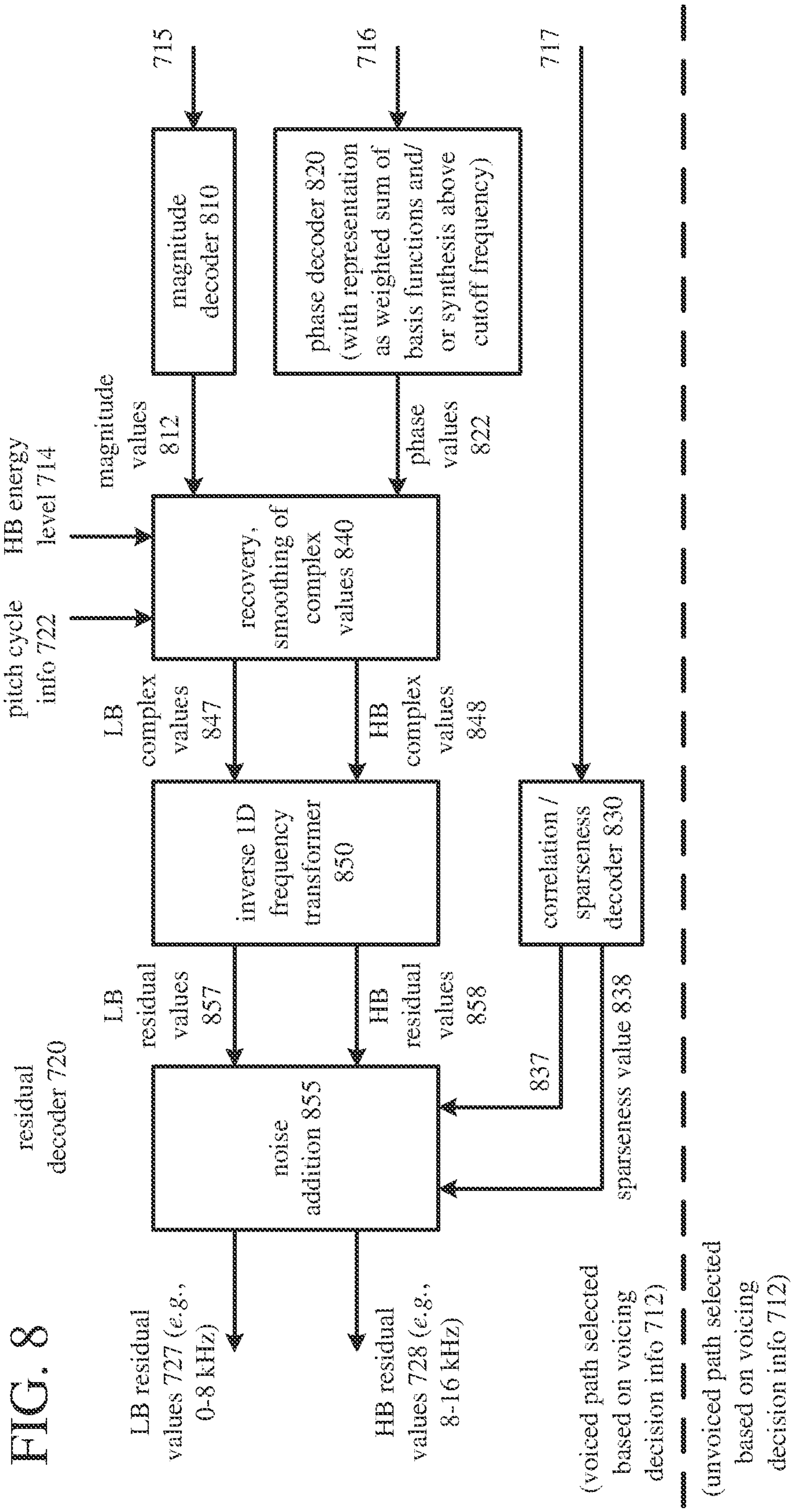
FIG. 8 is a diagram illustrating stages of decoding of residual values in the example speech decoder system of FIG. 7.

The residual decoder (720) is configured to decode residual values (727, 728) on a subframe-by-subframe basis or, alternatively, a frame-by-frame basis or some other basis. In particular, the residual decoder (720) is configured to decode a set of phase values and reconstruct residual values (727, 728) based at least in part on the set of phase values. FIG. 8 shows stages of decoding of residual values (727, 728) in the residual decoder (720).

In some places, the residual decoder (720) includes separate processing paths for residual values in different bands. In FIG. 8, low-band residual values (727) and high-band residual values (728) are decoded in separate paths, at least after reconstruction or generation of parameters for the respective bands. In some example implementations, for super-wideband speech, the residual decoder (720) produces low-band residual values (727) and high-band residual values (728). For wideband speech, however, the residual decoder (720) produces residual values (727) for one band. Alternatively (e.g., if the filterbank (760) combines more than two bands), the residual decoder (720) can decode residual values for more bands.

In the decoder system (700), the residual values (727, 728) are reconstructed using a model adapted for voiced speech content or a model adapted for unvoiced speech content. The residual decoder (720) includes stages of decoding in a path for voiced speech and stages (not shown) of decoding in a path for unvoiced speech. The residual decoder (720) is configured to select one of the paths based on the voicing decision information (712), which is provided to the residual decoder (720).

If the residual values (727, 728) are for voiced speech, complex amplitude values are reconstructed using a magnitude decoder (810), phase decoder (820), and recovery/smoothing module (840). The complex amplitude values are then transformed by an inverse frequency transformer (850), producing time-domain residual values that are processed by the noise addition module (855).

The magnitude decoder (810) is configured to reconstruct sets of magnitude values (812) for one or more subframes of a frame, using quantized parameters (715) for the sets of magnitude values (812). Depending on implementation, and generally reversing operations performed during encoding (with some loss due to quantization), the magnitude decoder (810) can use any of various combinations of inverse quantization operations (e.g., inverse vector quantization, inverse scalar quantization), prediction operations, and domain conversion operations (e.g., conversion from the frequency domain) to decode the sets of magnitude values (715) for the respective subframes.

The phase decoder (820) is configured to decode one or more sets of phase values (822), using quantized parameters (716) for the set(s) of phase values (822). The set(s) of phase values may be for a low band or for an entire range of reconstructed speech (775). The phase decoder (820) can decode a set of phase values (822) per subframe or a set of phase values (822) for a frame. In this case, the set of phase values (822) for the frame can represent phase values determined from averaged or otherwise aggregated complex amplitude values for the subframes of the frame (as explained in section III), and the decoded phase values (822) can be repeated for the respective subframes of the frame. Section VI explains operations of the phase decoder (820) in detail. In particular, the phase decoder (820) can be configured to perform operations to reconstruct at least some of a set of phase values (e.g., lower-frequency phase values, an entire range of phase values, or some other range of phase values) using a linear component and a weighted sum of basis functions. In this case, the count of coefficients that weight the basis functions can be based at least in part on a target bitrate for the encoded data. Further, the phase decoder (820) can be configured to perform operations to use at least some of a first subset (e.g., lower-frequency phase values) of a set of phase values to synthesize a second subset (e.g., higher-frequency phase values) of the set of phase value, where each phase value of the second subset has a frequency above a cutoff frequency. The cutoff frequency can be determined based at least in part on a target bitrate for the encoded data, pitch cycle information (722), and/or other criteria. Depending on the cutoff frequency, the higher-frequency phase values can span the high band, or the higher-frequency phase values can span part of the low band and the high band.

The recovery and smoothing module (840) is configured to reconstruct complex amplitude values based at least in part on the sets of magnitude values (812) and the set(s) of phase values (814). For example, the set(s) of phase values (814) for a frame are converted to the complex domain by taking the complex exponential and multiplied by harmonic magnitude values (812) to create complex amplitude values for the low band. The complex amplitude values for the low band can be repeated as complex amplitude values for the high band. Then, using the high-band energy level (714), which was dequantized, the high-band complex amplitude values can be scaled so that they more closely approximate the energy of the high band. Alternatively, the recovery and smoothing module (840) can produce complex amplitude values for more bands (e.g., if the filterbank (760) combines more than two bands) or for a single band (e.g., if the filterbank (760) is bypassed or omitted).

The recovery and smoothing module (840) is further configured to adaptively smooth the complex amplitude values based at least in part on pitch cycle information (722) and/or differences in amplitude values across boundaries. For example, complex amplitude values are smoothed across subframe boundaries, including subframe boundaries that are also frame boundaries.

For smoothing across subframe boundaries, the amount of smoothing can depend on pitch frequencies in adjacent subframes. Pitch cycle information (722) can be signaled per frame and indicate, for example, subframe lengths for subframes or other frequency information. The recovery and smoothing module (840) can be configured to use the pitch cycle information (722) to control the amount of smoothing. In some example implementations, if there is a large change in pitch frequency between subframes, complex amplitude values are not smoothed as much because a real signal change is present. On the other hand, if there is not much change in pitch frequency between subframes, complex amplitude values are smoothed more because a real signal change is not present. This smoothing tends to make the complex amplitude values more periodic, resulting in less noisy speech.

For smoothing across subframe boundaries, the amount of smoothing can also depend on amplitude values on the sides of a boundary between subframes. In some example implementations, if there is a large change in amplitude values across a boundary between subframes, complex amplitude values are not smoothed much because a real signal change is present. On the other hand, if there is not much change in amplitude values across a boundary between subframes, complex amplitude values are smoothed more because a real signal change is not present. Also, in some example implementations, complex amplitude values are smoothed more at lower frequencies and smoothed less at higher frequencies.

Alternatively, smoothing of complex amplitude values can be omitted.

The inverse frequency transformer (850) is configured to apply an inverse frequency transform to complex amplitude values. This produces low-band residual values (857) and high-band residual values (858). In some example implementations, the inverse 1D frequency transform is a variation of inverse Fourier transform (e.g., inverse DFT, inverse FFT) without overlap or, alternatively, with overlap. Alternatively, the inverse 1D frequency transform is some other inverse frequency transform that produces time-domain residual values from complex amplitude values. The inverse frequency transformer (850) can produce residual values for more bands (e.g., if the filterbank (760) combines more than two bands) or for a single band (e.g., if the filterbank (760) is bypassed or omitted).

The correlation/sparseness decoder (830) is configured to decode correlation values (837) and a sparseness value (838), using one or more quantized parameters (717) for the correlation values (837) and sparseness value (838). In some example implementations, the correlation values (837) and sparseness value (838) are recovered using a vector quantization index that jointly represents the correlation values (837) and sparseness value (838). Examples of correlation values and sparseness values are described in section III. Alternatively, the correlation values (837) and sparseness value (838) can be recovered in some other way.

The noise addition module (855) is configured to selectively add noise to the residual values (857, 858), based at least in part on the correlation values (837) and the sparseness value (838). In many cases, noise addition can mitigate metallic sounds in reconstructed speech (775).

In general, the correlation values (837) can be used to control how much noise (if any) is added the residual values (857, 858). In some example implementations, if the correlation values (837) are high (the signal is harmonic), little or noise is added to the residual values (857, 858). In this case, the model used for encoding/decoding voiced content tends to work well. On the other hand, if the correlation values (837) are low (the signal is not harmonic), more noise is added to the residual values (857, 858). In this case, the model used for encoding/decoding voiced content does not work as well (e.g., because the signal is not periodic, so averaging was not appropriate).

In general, the sparseness value (838) can be used to control where noise is added (e.g., how the added noise is distributed around pitch pulses). As a rule, noise is added where it improves perceptual quality. For example, noise is added at strong non-zero pitch pulses. For example, if the energy of the residual values (857, 858) is sparse (indicated by a high sparseness value), noise is added around the strong non-zero pitch pulses but not the rest of the residual values (857, 858). On the other hand, if the energy of the residual values (857, 858) is not sparse (indicated by a low sparseness value), noise is distributed more evenly throughout the residual values (857, 858). Also, in general, more noise can be added at higher frequencies than lower frequencies. For example, an increasing amount of noise is added at higher frequencies.

In FIG. 8, the noise addition module (855) adds noise to residual values for two bands. Alternatively, the noise addition module (855) can add noise to residual values for more bands (e.g., if the filterbank (760) combines more than two bands) or for a single band (e.g., if the filterbank (760) is bypassed or omitted).

If the residual values (727, 728) are for unvoiced speech, the residual decoder (720) includes one or more separate processing paths (not shown) for residual values. Depending on implementation, and generally reversing operations performed during encoding (with some loss due to quantization), the unvoiced path in the residual decoder (720) can use any of various combinations of inverse quantization operations (e.g., inverse vector quantization, inverse scalar quantization), energy/noise substitution operations, and filtering operations to decode the residual values (727, 728) for unvoiced speech.

In FIGS. 7 and 8, the residual encoder (720) is shown processing low-band residual values (727) and high-band residual value (728). Alternatively, the residual encoder (380) can process residual values in more bands or a single band (e.g., if filterbank (760) is bypassed or omitted).

Returning to FIG. 7, in the decoder system (700), the LPC recovery module (740) is configured to reconstruct LP coefficients for the respective bands (or all of the reconstructed speech, if multiple bands are not present). Depending on implementation, and generally reversing operations performed during encoding (with some loss due to quantization), the LPC recovery module (740) can use any of various combinations of inverse quantization operations (e.g., inverse vector quantization, inverse scalar quantization), prediction operations, and domain conversion operations (e.g., conversion from the LSF domain) to reconstruct the LP coefficients.

The decoder system (700) of FIG. 7 includes two synthesis filters (360, 362), e.g., filters $A^{-1}(z)$. The synthesis filters (750, 752) are configured to filter the residual values (727, 728) according to the reconstructed LP coefficients. The filtering converts the low-band residual values (727) and high-band residual values (728) to the speech domain, producing reconstructed speech for a low band (757) and reconstructed speech for a high band (758). In FIG. 7, the low-band synthesis filter (750) is configured to filter low-band residual values (727), which are for an entire range of reconstructed speech (775) if the filterbank (760) is bypassed, according to recovered low-band LP coefficients. The high-band synthesis filter (752) is configured to filter high-band residual values (728) according to the recovered high-band LP coefficients. If the filterbank (760) is configured to combine more bands into the reconstructed speech (775), the decoder system (700) can include more synthesis filters for the respective bands. If the filterbank (760) is omitted, the decoder system (700) can include a single synthesis filter for the entire range of reconstructed speech (775).

The filterbank (760) is configured to combine multiple bands (757, 758) that result from filtering of the residual values (727, 728) in corresponding bands by the synthesis filters (750, 752), producing reconstructed speech (765). In FIG. 7, the filterbank (760) is configured to combine two equal bands—a low band (757) and a high band (758). For example, if the reconstructed speech (775) is for a super-wideband signal, the low band (757) can include speech in the range of 0-8 kHz, and the high band (758) can include speech in the range of 8-16 kHz. Alternatively, the filterbank (760) combines more bands and/or unequal bands to synthesis the reconstructed speech (775). The filterbank (760) can use any of various types of IIR or other filters, depending on implementation.

The post-processing filter (770) is configured to selectively filter the reconstructed speech (765), producing reconstructed speech (775) for output. Alternatively, the post-processing filter (770) can be omitted, and the reconstructed speech (765) from the filterbank (760) is output. Or, if the filterbank (760) is also omitted, the output from the synthesis filter (750) provides reconstructed speech for output.

Depending on implementation and the type of compression desired, modules of the decoder system (700) can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder system (700). The relationships shown between modules within the decoder system (700) indicate general flows of information in the decoder system (700); other relationships are not shown for the sake of simplicity.

VI. Examples of Phase Reconstruction in a Speech Decoder

This section describes innovations in phase reconstruction during speech decoding. In many cases, the innovations can improve the performance of a speech codec in low bitrate scenarios, even when encoded data is delivered over a network that suffers from insufficient bandwidth or transmission quality problems. The innovations described in this section fall into two main sets of innovations, which can be used separately or in combination.

According to a first set of innovations, when a speech decoder decodes a set of phase values, the speech decoder reconstructs at least some of the set of phase values using a linear component and a weighted sum of basis functions. Using a linear component and a weighted sum of basis functions, phase values can be represented in a compact and flexible way, which can improve rate-distortion performance in low bitrate scenarios. The speech decoder can decode a set of coefficients that weight the basis functions, then use the set of coefficients when reconstructing phase values. The speech decoder can also decode and use an offset value, slope value, and/or other parameter, which define the linear component. A count of coefficients that weight the basis functions can be predefined and unchanging. Or, to provide flexibility for encoding/decoding speech at different target bitrates, the count of coefficients can depend on target bitrate.

According to a second set of innovations, when a speech decoder decodes a set of phase values, the speech decoder reconstructs lower-frequency phase values (which are below a cutoff frequency) then uses at least some of the lower-frequency phase values to synthesize higher-frequency phase values (which are above the cutoff frequency). By synthesizing the higher-frequency phase values based on the reconstructed lower-frequency phase values, the speech decoder can efficiently reconstruct a full range of phase values, which can improve rate-distortion performance in low bitrate scenarios. The cutoff frequency can be predefined and unchanging. Or, to provide flexibility for encoding/decoding speech at different target bitrates or encoding/decoding speech with different characteristics, the speech decoder can determine the cutoff frequency based at least in part on a target bitrate for the encoded data, pitch cycle information, and/or other criteria.

A. Reconstructing Phase Values Using a Weighted Sum of Basis Functions.

When decoding a set of phase values, a speech decoder can reconstruct the set of phase values using a weighted sum of basis functions. For example, when the basis functions are sine functions, a quantized set of phase values $P_i$ is defined as:

$$P_i = 0.6 \cdot \sum_{n=1}^{N} \sin\left(\frac{\pi n(i+0.5)}{I}\right) K_n, \quad \text{for } 0 \le i \le I-1,$$

where N is the count of quantization coefficients (hereafter, "coefficients") that weight the basis functions, $K_n$ is one of the coefficients, and I is the count of complex amplitude values (and hence frequency bins having phase values). In some example implementations, the basis functions are sine functions, but the basis functions can instead be cosine functions or some other type of basis functions. The set of phase values that is reconstructed from quantized values can be lower-frequency phase values (if higher-frequency phase values have been discarded, as described in previous sections), a full range of phase values (if higher-frequency phase values have not been discarded), or some other range of phase values. The set of phase values that is decoded can be a set of phase values for a frame or a set of phase values for a subframe of a frame.

A final quantized set of phase values $P_{final\_i}$ is defined using the quantized set of phase values $P_i$ (the weighted sum of basis functions) and a linear component. The linear component can be defined as a×i+b, where a represents a slope value, and where b represents an offset value. For example, $P_{final\_i}=P_i+a\times i+b$. Alternatively, the linear component can be defined using other and/or additional parameters.

To reconstruct a set of phase values, the speech decoder entropy decodes a set of coefficients $K_n$, which have been quantized. The coefficients $K_n$ weight the basis functions. In some example implementations, the values of $K_n$ are quantized as integer values. For example, the values for the coefficients $K_n$ are integer values limited in magnitude as follows.

$$|K_n|\leq 5, \text{ if } n=1$$

$$|K_n|\leq 3, \text{ if } n=2$$

$$|K_n|=\leq 2, \text{ if } n=3$$

$$|K_n|\leq 1, \text{ if } n\geq 4.$$

Alternatively, the values for the coefficients $K_n$ can be limited according to other constraints.

Although the count N of coefficients $K_n$ can be predefined and unchanging, there are advantages to changing the count N of coefficients $K_n$ adaptively. To provide flexibility for encoding/decoding speech at different target bitrates, the speech decoder can determine a count N of coefficients $K_n$ based at least in part on a target bitrate for the encoded data. For example, depending on target bitrate, the speech decoder can determine the count N of coefficients $K_n$ as a fraction of the count I of complex amplitude values (count of frequency bins having phase values). In some example implementations, the fraction ranges from 0.29 to 0.51. Alternatively, the fraction can have some other range. If the target bitrate is high, the count N of coefficients $K_n$ is high (that is, there are more coefficients $K_n$). If the target bitrate is low, the count N of coefficients $K_n$ is low (that is, there are fewer coefficients $K_n$). The speech decoder can determine the count N of coefficients $K_n$ using a lookup table that associates different coefficient counts with different target bitrates. Or, the speech decoder can determine the count N of coefficients $K_n$ according to rules, logic, etc. in some other way, so long as the count N of coefficients $K_n$ was similarly set at a corresponding speech encoder. The count N of coefficients $K_n$ can also depend on average pitch frequency and/or other criteria. The speech decoder can determine the count N of coefficients $K_n$ on a frame-by-frame basis, e.g., as average pitch frequency changes, or on some other basis.

In addition to reconstructing the set of coefficients $K_n$, the speech decoder decodes parameters for the linear component. For example, the speech decoder decodes an offset value b and a slope value a, which are used to reconstruct the linear component. The offset value b indicates a linear phase (offset) to the start of the weighted sum of basis functions, so that the result $P_{final\_i}$ more closely approximates the original phase signal. The slope value a indicates an overall slope, applied as a multiplier or scaling factor for the linear component, so that the result $P_{final\_i}$ more closely approximates the original phase signal. After entropy decoding the offset value, slope value, and/or other value, the speech decoder inverse quantizes the value(s). Alternatively, the speech decoder can decode other and/or additional parameters for the linear component or weighted sum of basis functions.

In some example implementations, a residual decoder in a speech decoder, based at least in part on target bitrate for encoded data, determines a count of coefficients that weight basis functions. The residual decoder decodes a set of coefficients, an offset value, and a slope value. Then, the residual decoder uses the set of coefficients, the offset value, and the slope value to reconstruct an approximation of phase values. The residual decoder applies the coefficients $K_n$ to get the weighted sum of basis functions, e.g., adding up sine functions multiplied by the coefficients $K_n$. Then, the residual decoder applies the slope value and the offset value to reconstruct the linear component, e.g., multiplying the frequency by the slope value and adding the offset value. Finally, the residual decoder combines the linear component and the weighted sum of basis functions.

B. Synthesizing Higher-Frequency Phase Values.

When decoding a set of phase values, a speech decoder can reconstruct lower-frequency phase values, which are below a cutoff frequency, and synthesize higher-frequency phase values, which are above the cutoff frequency, using at least some of the lower-frequency phase values. The set of phase values that is decoded can be a set of phase values for a frame or a set of phase values for a subframe of a frame. The lower-frequency phase values can be reconstructed using weighted sum of basis functions (as described in the previous section) or reconstructed in some other way. The synthesized higher-frequency phase values can partially or complete substitute for higher-frequency phase values that were discarded during encoding. Alternatively, the synthesized higher-frequency phase values can extend past the frequency of discarded phase values to a higher frequency.

Although a cutoff frequency can be predefined and unchanging, there are advantages to changing the cutoff frequency adaptively. For example, to provide flexibility for encoding/decoding speech at different target bitrates or encoding/decoding speech with different characteristics, the speech decoder can determine a cutoff frequency based at least in part on a target bitrate for the encoded data and/or pitch cycle information, which can indicate average pitch frequency. For example, if a frame includes high-frequency speech content, a higher cutoff frequency is used. On the other hand, if a frame includes only low-frequency speech content, a lower cutoff frequency is used. With respect to target bitrate, if target bitrate is lower, the cutoff frequency is lower. If target bitrate is higher, the cutoff frequency is higher. In some example implementations, the cutoff frequency falls within the range of 962 Hz (for a low target bitrate and low average pitch frequency) to 4160 Hz (for a high target bitrate and high average pitch frequency). Alternatively, the cutoff frequency can vary within some other range and/or depend on other criteria.

The speech decoder can determine the cutoff frequency on a frame-by-frame basis. For example, the speech decoder can determine the cutoff frequency for a frame as average pitch frequency changes from frame-to-frame, even if target bitrate changes less often. Alternatively, the cutoff frequency can change on some other basis and/or depend on other criteria. The speech decoder can determine the cutoff frequency using a lookup table that associates different cutoff frequencies with different target bitrates and average pitch frequencies. Or, the speech decoder can determine the cutoff frequency according to rules, logic, etc. in some other way, so long as the cutoff frequency is similarly set at a corresponding speech encoder.

Depending on implementation, a phase value exactly at the cutoff frequency can be treated as one of the higher-frequency phase values (synthesized) or as one of the lower-frequency phase values (reconstructed from quantized parameters in the bitstream).

Figure 9A:
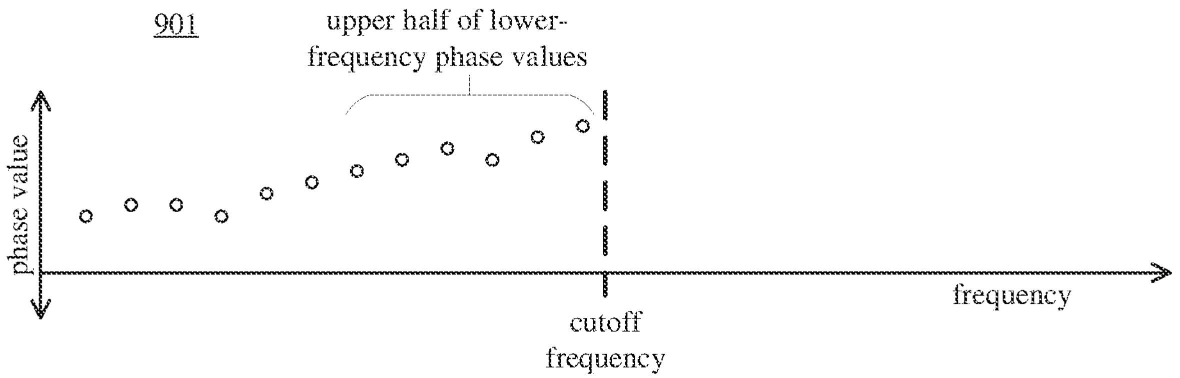
FIGS. 9*a*-9*c* are diagrams illustrating an example approach to synthesis of phase values having a frequency above a cutoff frequency.
Figure 9B:
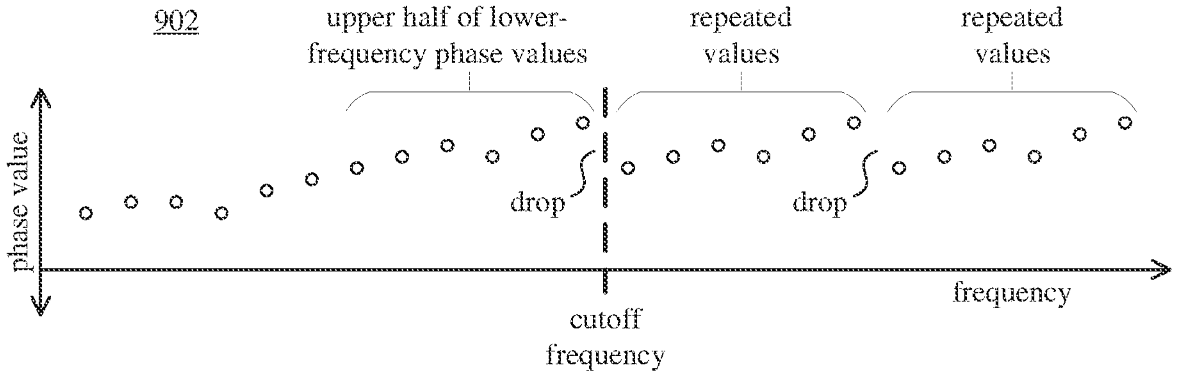
Figure 9C:
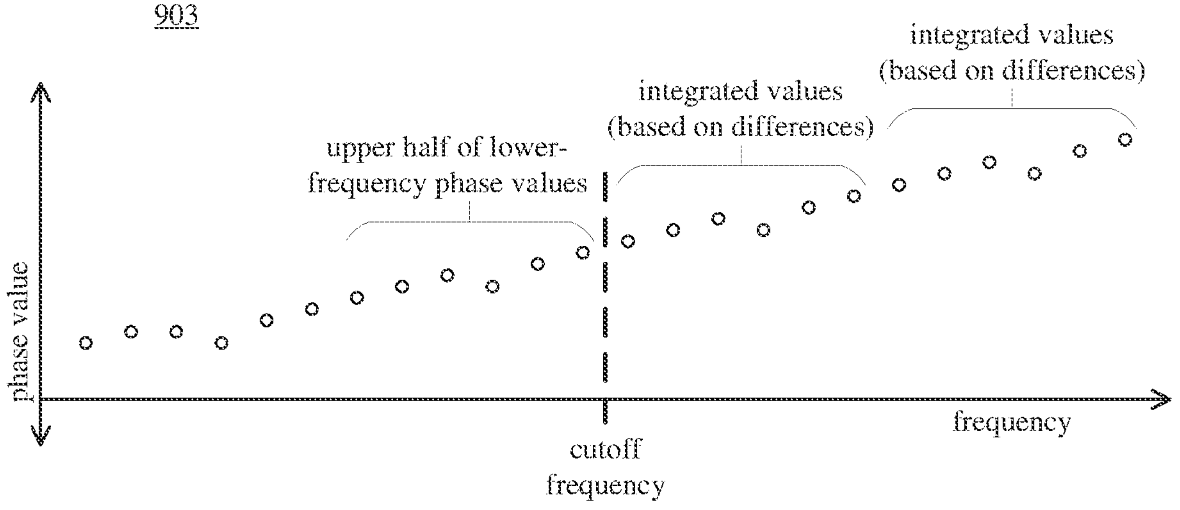

The higher-frequency phase values can be synthesized in various ways, depending on implementation. FIGS. 9*a*-9*c* show features (901-903) of example approaches to synthesis of higher-frequency phase values, which have a frequency above a cutoff frequency. In the simplified examples of FIGS. 9*a*-9*c*, the lower-frequency phase values include 12 phase values: 5 6 6 5 7 8 9 10 11 10 12 13.

To synthesize higher-frequency phase values, a speech decoder identifies a range of lower-frequency phase values. In some example implementations, the speech decoder identifies the upper half of the frequency range of lower-frequency phase values that have been reconstructed, potentially adding or removing a phase value to have an even count of harmonics. In the simplified example of FIG. 9*a*, the upper half of the lower-frequency phase values includes six phase values: 9 10 11 10 12 13. Alternatively, the speech decoder can identify some other range of the lower-frequency phase values that have been reconstructed.

The speech decoder repeats phase values based on the lower-frequency phase values in the identified range, starting from the cutoff frequency and continuing through the last phase value in the set of phase values. The lower-frequency phase values in the identified range can be repeated one time or multiple times. If repetition of the lower-frequency phase values in the identified range does not exactly align with the end of the phase spectrum, the lower-frequency phase values in the identified range can be partially repeated. In FIG. 9*b*, the lower-frequency phase values in the identified range are repeated to generate the higher-frequency phase values, up to the last phase value. Simply repeating lower-frequency phase values in an identified range can lead to abrupt transitions in the phase spectrum, however, which are not found in the original phase spectrum in typical cases. In FIG. 9*b*, for example, repeating the six phase values: 9 10 11 10 12 13 leads to two sudden drops in phase values from 13 to 9: 5 6 6 5 7 8 9 10 11 10 12 13 9 10 11 10 12 13 9 10 11 10 12 13.

To address this issue, the speech decoder can determine (as a pattern) differences between adjacent phase values in the identified range of lower-frequency phase values. That is, for each of the phase values in the identified range of lower-frequency phase values, the speech decoder can determine the difference relative to the previous phase value (in frequency order). The speech decoder can then repeat the phase value differences, starting from the cutoff frequency and continuing through the last phase value in the set of phase values. The phase value differences can be repeated one time or multiple times. If repetition of the phase value differences does not exactly align with the end of the phase spectrum, the phase value differences can be partially repeated. After repeating the phase value differences, the speech decoder can integrate the phase value differences between adjacent phase values to generate the higher-frequency phase values. That is, for each higher-frequency phase values, starting from the cutoff frequency, the speech decoder can add the corresponding phase value difference to the previous phase value (in frequency order). In FIG. 9*c*, for example, for the six phase values in the identified range—9 10 11 10 12 13—the phase value differences are +1 +1 +1 −1 +2 +1. The phase values differences are repeated twice, from the cutoff frequency to the end of the phase spectrum: 5 6 6 5 7 8 9 10 11 10 12 13 +1 +1 +1 −1 +2 +1 +1 +1 +1 −1 +2 +1. Then, the phase value differences are integrated to generate the higher-frequency phase values: 5 6 6 5 7 8 9 10 11 10 12 13 14 15 16 15 17 18 19 20 21 20 22 23.

In this way, the speech decoder can reconstruct phase values for an entire range of reconstructed speech. For example, if the reconstructed speech is super-wideband speech that has been split into a low band and high band, the speech decoder can synthesize phase values for part of the low band (above a cutoff frequency) and all of a high band using reconstructed phase values from below the cutoff frequency in the low band. Alternatively, the speech decoder can synthesize phase values just for part of the low band (above a cutoff frequency) using reconstructed phase values below the cutoff frequency in the low band.

Alternatively, in some other way, the speech decoder can synthesize higher-frequency phase values using at least some lower-frequency phase values that have been reconstructed.

C. Example Techniques for Phase Reconstruction in Speech Decoding

Figure 10A:
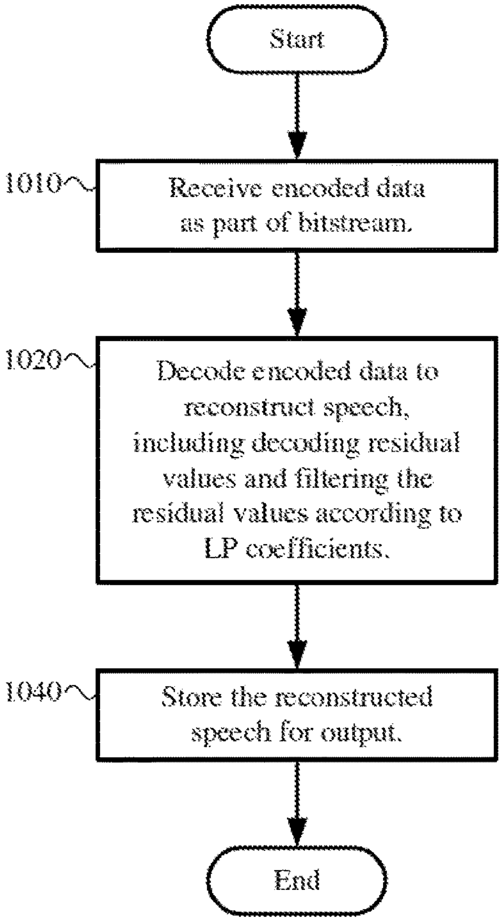
FIGS. 10*a*-10*d* are flowcharts illustrating techniques for speech decoding that includes reconstructing phase values represented as a weighted sum of basis functions and/or synthesis of phase values having a frequency above a cutoff frequency.
Figure 10B:
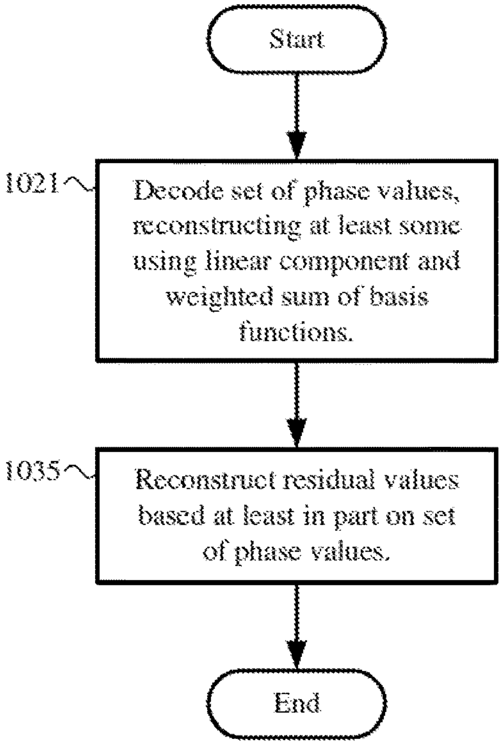
Figure 10C:
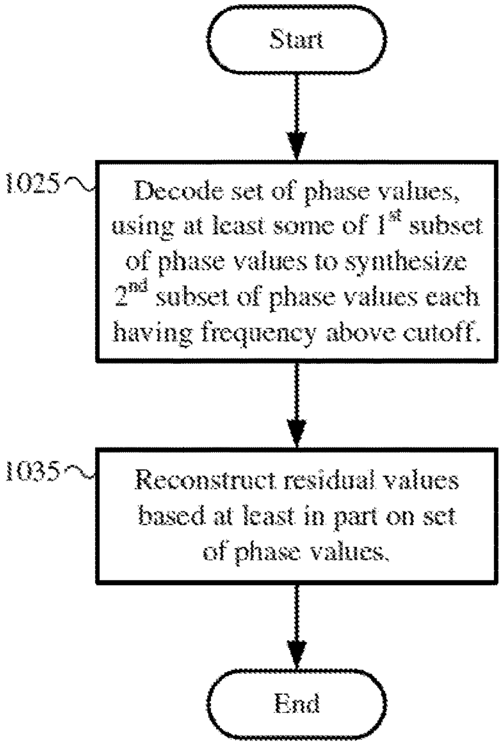
Figure 10D:
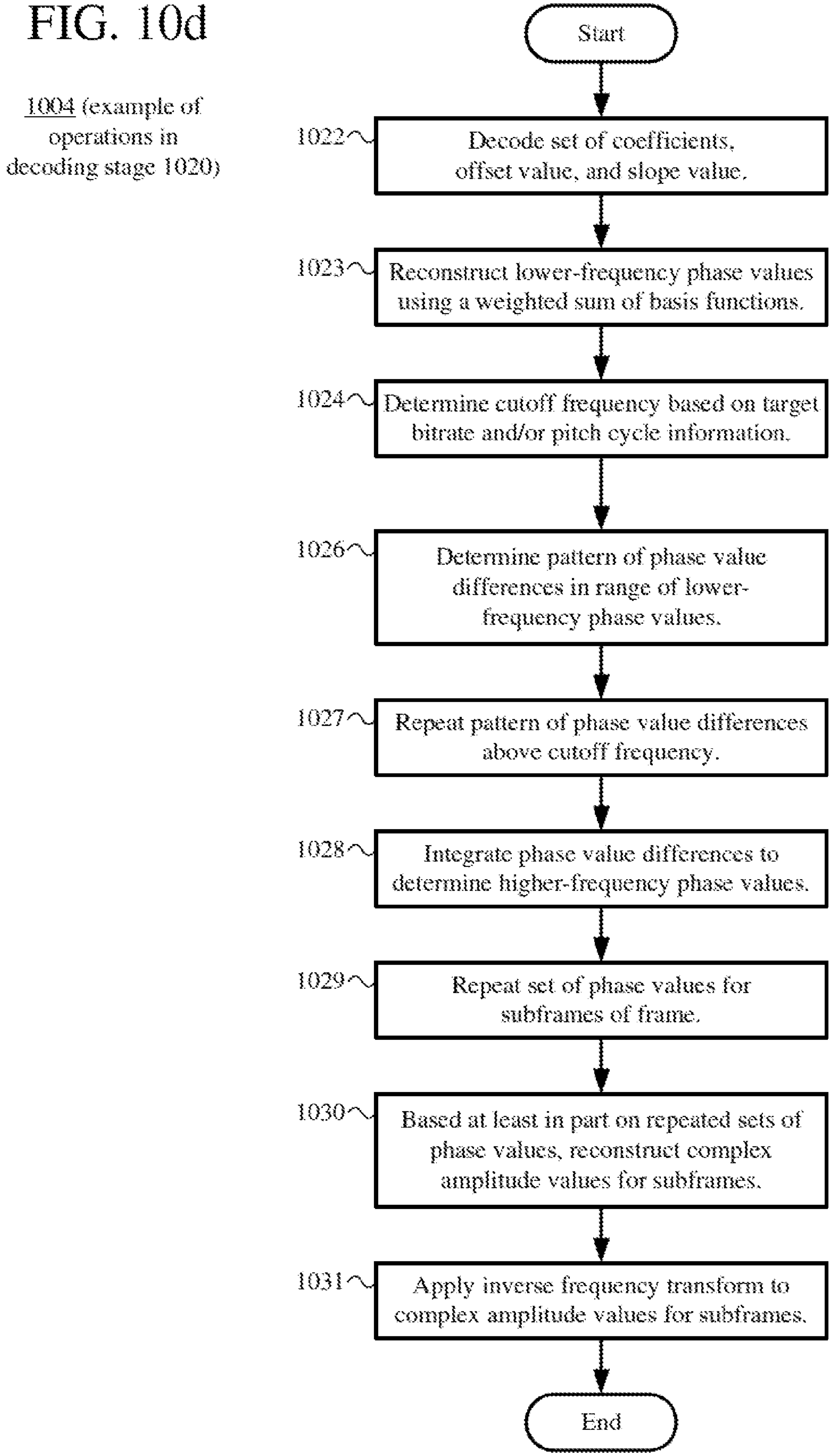

FIG. 10*a* shows a generalized technique (1001) for speech decoding, which can include additional operations as shown in FIG. 10*b*, FIG. 10*c*, or FIG. 10*d*. FIG. 10*b* shows a generalized technique (1002) for speech decoding that includes reconstructing phase values represented using a linear component and a weighted sum of basis functions. FIG. 10*c* shows a generalized technique (1003) for speech decoding that includes synthesizing phase values having a frequency above a cutoff frequency. FIG. 10*d* shows a more specific example technique (1004) for speech decoding that includes reconstructing lower-frequency phase values (which are below a cutoff frequency) represented using a linear component and a weighted sum of basis functions, and synthesizing higher-frequency phase values (which are above the cutoff frequency). The techniques (1001-1004) can be performed by a speech decoder as described with reference to FIGS. 7 and 8 or by another speech decoder.

With reference to FIG. 10*a*, the speech decoder receives (1010) encoded data as part of a bitstream. For example, an input buffer implemented in memory of a computer system is configured to receive and store the encoded data as part of a bitstream.

The speech decoder decodes (1020) the encoded data to reconstruct speech. As part of the decoding (1020), the speech decoder decodes residual values and filters the residual values according to linear prediction coefficients. The residual values can be, for example, for bands of reconstructed speech later combined by a filterbank. Alternatively, the residual values can be for reconstructed speech that is not in multiple bands. In any case, the filtering produces reconstructed speech, which may be further processed. FIGS. 10*b*-10*d* show examples of operations that can be performed as part of the decoding (1020) stage.

The speech decoder stores (1040) the reconstructed speech for output. For example, an output buffer implemented in memory of the computer system is configured to store the reconstructed speech for output.

With reference to FIG. 10*b*, the speech decoder decodes (1021) a set of phase values for residual values. The set of phase values can be for a subframe of residual values or for a frame of residual values. In decoding (1021) the set of phase values, the speech decoder reconstructs at least some of the set of phase values using a linear component and a weighted sum of basis functions. For example, the basis functions are sine functions. Alternatively, the basis functions are cosine functions or some other basis function. The phase values represented as a weighted sum of basis functions can be lower-frequency phase values (if higher-frequency phase values have been discarded), an entire range of phase values, or some other range of phase values.

To decode the set of phase values, the speech decoder can decode a set of coefficients that weight the basis functions, and decode an offset value and a slope value that parameterize the linear component, then use the set of coefficients, offset value, and slope value as part of the reconstruction of at least some of the set of phase values. Alternatively, the speech decoder can decode the set of phase values using a set of coefficients that weight the basis functions along with some other combination of parameters that define the linear component (e.g., no offset value, or no slope value, or using one or more other parameters). Or, in combination with a set of coefficients that weight the basis functions and the linear component, the speech decoder can use still other parameters to reconstruct at least some of a set of phase values. The speech decoder can determine the count of coefficients that weight the basis functions based at least in part on target bitrate for the encoded data (as described above) and/or other criteria.

The speech decoder reconstructs (1035) the residual values based at least in part on the set of phase values. For example, if the set of phase values is for a frame, the speech decoder repeats the set of phase values for one or more subframes of the frame. Then, based at least in part on the repeated sets of phase values for the respective subframes, the speech decoder reconstructs complex amplitude values for the respective subframes. Finally, the speech decoder applies an inverse frequency transform to the complex amplitude values for the respective subframes. The inverse frequency transform can be a variation of inverse Fourier transform (e.g., inverse DFT, inverse FFT) or some other inverse frequency transform that reconstructs residual values from complex amplitude values. Alternatively, the speech decoder reconstructs the residual values in some other way, e.g., by reconstructing phase values for an entire frame, which has not been split into subframes, and applying an inverse frequency transform to complex amplitude values for the entire frame.

With reference to FIG. 10*c*, the speech decoder decodes (1025) a set of phase values. The set of phase values can be for a subframe of residual values or for a frame of residual values. In decoding (1025) the set of phase values, the speech decoder reconstructs a first subset (e.g., lower-frequency phase values) of the set of phase values and uses at least some of the first subset of phase values to synthesize a second subset (e.g., higher-frequency phase values) of the set of phase values. Each phase value of the second subset of phase values has a frequency above a cutoff frequency. The speech decoder can determine the cutoff frequency based at least in part on a target bitrate for the encoded data, pitch cycle information, and/or other criteria. Depending on implementation, a phase value exactly at the cutoff frequency can be treated as one of the higher-frequency phase values (synthesized) or as one of the lower-frequency phase values (reconstructed from quantized parameters in the bitstream).

When using at least some of the first subset of phase values to synthesize the second subset of phase values, the speech decoder can determine a pattern in a range of the first subset then repeat the pattern above the cutoff frequency. For example, the speech decoder can identify the range and then determine, as the pattern, adjacent phase values in the range. In this case, the adjacent phase values in the range are repeated after the cutoff frequency to generate the second subset. Or, as another example, the speech decoder can identify the range and then determine, as the pattern, differences between adjacent phase values in the range. In this case, the speech decoder can repeat the phase value differences above the cutoff frequency, then integrate differences between adjacent phase values after the cutoff frequency to determine the second subset.

The speech decoder reconstructs (1035) the residual values based at least in part on the set of phase values. For example, the speech decoder reconstructs the residual values as described with reference to FIG. 10*b*.

In the example technique (1004) of FIG. 10*d*, when decoding a set of phase values for residual values, the speech decoder reconstructs lower-frequency phase values (which are below a cutoff frequency) represented as a weighted sum of basis functions and synthesizes higher-frequency phase values (which are above the cutoff frequency).

The speech decoder decodes (1022) a set of coefficients, offset value, and slope value. The speech decoder reconstructs (1023) lower-frequency phase values using a linear component and a weighted sum of basis functions, which are weighted according to the set of coefficients then adjusted according to the linear component (based on the slope value and offset value).

To synthesize the higher-frequency phase values, the speech decoder determines (1024) a cutoff frequency based on target bitrate and/or pitch cycle information. The speech decoder determines (1026) a pattern of phase value differences in a range of the lower-frequency phase values. The speech decoder repeats (1027) the pattern above the cutoff frequency then integrates (1028) the phase value differences between adjacent phase values to determine the higher-frequency phase values. Depending on implementation, a phase value exactly at the cutoff frequency can be treated as one of the higher-frequency phase values (synthesized) or as one of the lower-frequency phase values (reconstructed from quantized parameters in the bitstream).

To reconstruct residual values, the speech decoder (1029) repeats the set of phase values for subframes of a frame. Then, based at least in part on the repeated sets of phase values, the speech decoder reconstructs (1030) complex amplitude values for the subframes. Finally, the speech decoder applies (1031) an inverse frequency transform to the complex amplitude values for the respective subframes, producing residual values.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more non-transitory computer-readable media having stored thereon computer-executable instructions for causing one or more processing units, when programmed thereby, to perform operations comprising:
receiving encoded data as part of a bitstream;
decoding the encoded data to reconstruct speech, including:
decoding residual values, including:
decoding a set of phase values, including reconstructing at least some of the set of phase values using a weighted sum of basis functions; and
reconstructing the residual values based at least in part on the set of phase values; and
filtering the residual values according to linear prediction coefficients; and
storing the reconstructed speech for output.

2. The one or more computer-readable media of claim 1, wherein the reconstructing the residual values includes:
based at least in part on the set of phase values, reconstructing complex amplitude values for respective subframes of a current frame; and
applying an inverse frequency transform to the complex amplitude values for the respective subframes.

3. The one or more computer-readable media of claim 1, wherein the reconstructed phase values are lower-frequency phase values of the set of phase values, and wherein the decoding the set of phase values further includes using at least some of the lower-frequency phase values to synthesize higher-frequency phase values of the set of phase values, each of the higher-frequency phase values having a frequency above a cutoff frequency, the cutoff frequency being based at least in part on a target bitrate for the encoded data and/or pitch cycle information.

4. The one or more computer-readable media of claim 1, wherein the decoding the set of phase values further includes:
decoding a set of coefficients that weight the basis functions;
decoding an offset value and a slope value that parameterize a linear component; and
using the set of coefficients, the offset value, and the slope value as part of the reconstructing the at least some of the set of phase values.

5. The one or more computer-readable media of claim 1, wherein the reconstructing the residual values includes reconstructing complex amplitude values for one or more subframes, including:
dequantizing a level of energy for a high band; and
scaling high-band complex amplitude values using the dequantized level of energy.

6. The one or more computer-readable media of claim 1, wherein the reconstructing the residual values further includes:
based at least in part on the set of phase values, reconstructing complex amplitude values for one or more subframes;
adaptively smoothing the complex amplitude values for the respective subframes based at least in part on one or more of pitch cycle information and differences in amplitude values across boundaries;
applying an inverse frequency transform to the smoothed complex amplitude values for the respective subframes; and
selectively adding noise to the residual values based at least in part on correlation values and a sparseness value.

7. One or more non-transitory computer-readable media having stored thereon encoded data as part of a bitstream, the encoded data being organized to facilitate decoding to reconstruct speech by performing operations comprising:
decoding residual values, including:
decoding a sparseness value and correlation values;
decoding one or more sets of magnitude values;
decoding a set of phase values; and
reconstructing the residual values, including:
reconstructing complex amplitude values for one or more subframes of a current frame using the one or more sets of magnitude values and the set of phase values;
applying an inverse frequency transform to the complex amplitude values for the respective subframes; and
selectively adding noise to the residual values based at least in part on the correlation values and the sparseness value; and
filtering the residual values according to linear prediction coefficients; and
storing the reconstructed speech for output.

8. The one or more computer-readable media of claim 7, wherein the reconstructing the residual values further includes adaptively smoothing the complex amplitude values for the respective subframes based at least in part on one or more of pitch cycle information and differences in amplitude values across boundaries, and wherein the inverse frequency transform is applied to the smoothed complex amplitude values.

9. The one or more computer-readable media of claim 7, wherein the reconstructing the residual values further includes repeating the set of phase values for at least one of the one or more subframes, and wherein the complex amplitude values for the respective subframes are reconstructed using the repeated sets of phase values.

10. The one or more computer-readable media of claim 7, wherein the decoding the set of phase values includes using at least some lower-frequency phase values to synthesize higher-frequency phase values of the set of phase values, each of the higher-frequency phase values having a frequency above a cutoff frequency, the cutoff frequency being based at least in part on a target bitrate for the encoded data and/or pitch cycle information.

11. The one or more computer-readable media of claim 7, wherein the decoding the set of phase values includes reconstructing at least some of the set of phase values using a weighted sum of basis functions.

12. The one or more computer-readable media of claim 11,
wherein the decoding the set of phase values further includes:
decoding a set of coefficients that weight the basis functions;
decoding an offset value and a slope value that parameterize a linear component; and
using the set of coefficients, the offset value, and the slope value as part of the reconstructing the at least some of the set of phase values.

13. One or more non-transitory computer-readable media having stored thereon computer-executable instructions for causing one or more processing units, when programmed thereby, to perform operations comprising:
receiving speech input;
encoding the speech input to produce encoded data, including:

filtering input values based on the speech input according to linear prediction coefficients, thereby producing residual values; and encoding the residual values, including:

determining a set of phase values; and encoding the set of phase values, wherein at least some of the set of phase values are represented using a weighted sum of basis functions; and storing the encoded data for output as part of a bitstream.

14. The one or more computer-readable media of claim 13, wherein the encoding the set of phase values includes omitting any of the set of phase values having a frequency above a cutoff frequency, the cutoff frequency being based at least in part on a target bitrate for the encoded data and/or pitch cycle information.

15. The one or more computer-readable media of claim 13, wherein the encoding the set of phase values includes:

using a delayed decision approach to determine a set of coefficients that weight the basis functions;

based at least in part on a target bitrate for the encoded data, setting a count of coefficients that weight the basis functions; and/or using a cost function based at least in part on linear phase measure to determine a score for a candidate set of coefficients that weight the basis functions.

16. The one or more computer-readable media of claim 13, wherein the at least some of the set of phase values is also represented using a linear component, and wherein the encoding the set of phase values includes:

determining an offset value and a slope value that parameterize the linear component.

17. The one or more computer-readable media of claim 13, wherein the encoding the speech input further includes:

separating the speech input into multiple bands, wherein the multiple bands provide the input values filtered to produce the residual values in corresponding bands, and wherein the set of phase values is determined and encoded for a low band among the corresponding bands of the residual values.

18. The one or more computer-readable media of claim 17, wherein the encoding the residual values further includes:

measuring a level of energy for a high band among the corresponding bands of the residual values; and quantizing the level of energy.

19. The one or more computer-readable media of claim 13, wherein the encoding the speech input further includes one or more of:

(a) determining and quantizing the linear prediction coefficients;

(b) performing pitch analysis, thereby producing pitch cycle information, wherein the pitch cycle information is a set of subframe lengths corresponding to pitch cycles;

(c) performing voicing analysis, thereby producing voicing decision information; and (d) organizing the residual values as variable-length frames.

20. The one or more computer-readable media of claim 13, wherein the encoding the residual values further includes, for a current frame:

applying a one-dimensional frequency transform to one or more subframes of the current frame, thereby producing complex amplitude values for the respective subframes;

determining sets of magnitude values for the respective subframes based at least in part on the complex amplitude values for the respective subframes; and encoding the sets of magnitude values for the respective subframes.

* * * * *